United States Patent
Shinohara et al.

(10) Patent No.: US 7,480,814 B2
(45) Date of Patent: Jan. 20, 2009

(54) FAIL OVER CLUSTER SYSTEM AND FAIL OVER METHOD

(75) Inventors: Tomohiro Shinohara, Yokohama (JP); Hidenori Sugiyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 524 days.

(21) Appl. No.: 11/122,024

(22) Filed: May 5, 2005

(65) Prior Publication Data

US 2006/0224764 A1 Oct. 5, 2006

(30) Foreign Application Priority Data

Mar. 18, 2005 (JP) ............................. 2005-078984

(51) Int. Cl.
*G06F 11/00* (2006.01)
(52) U.S. Cl. ........................................... 714/4; 714/13
(58) Field of Classification Search ................. 714/1–52
See application file for complete search history.

(56) References Cited

U.S. PATENT DOCUMENTS 7,177,913 B2 * 2/2007 Connor ....................... 709/212

2005/0228947 A1 * 10/2005 Morita et al. ................ 711/114

FOREIGN PATENT DOCUMENTS

JP 11-353292 12/1999

* cited by examiner

*Primary Examiner*—Scott T. Baderman
*Assistant Examiner*—Jigar Patel
(74) *Attorney, Agent, or Firm*—Antonelli, Terry, Stout & Kraus, LLP.

(57) ABSTRACT

A cluster system coupled to a client computer via a network has plural nodes which provide services to the client computer. A first node of the plural nodes has a priority recognizing processing module, which consults a priority of a frame received from the client computer. A second node of the plural nodes has a fail over processing module, which performs fail over on plural software resources managed by the first node according to an order of fail over priority that is based on the priority consulted by the priority recognizing processing module of the first node.

3 Claims, 26 Drawing Sheets

VLANID-PRIORITY ASSOCIATION TABLE 700

| VLAN ID | PRIORITY |
|---|---|
| 10 | 7 |
| 20 | 5 |
| 30 | 4 |
| 40 | 2 |
| 50 | 2 |
| 60 | 3 |
| : | : |

VLAN ID-SERVICE IP ADDRESS ASSOCIATION TABLE

| VLAN ID | ID-SERVICE IP ADDRESS |
|---|---|
| 10 | SIP-V10 |
| 20 | SIP-V20 |
| 30 | SIP-V30 |
| 40 | SIP-V40 |
| 50 | SIP-V50 |
| 60 | SIP-V60 |
| : | : |

*FIG. 9*

FILE SYSTEM-RESOURCE GROUP ASSOCIATION TABLE

| RESOURCE GROUP NAME | FILE SYSTEM NAME |
|---|---|
| RG1-1 | FS-1A |
|  | FS-1B |
|  | FS-1C |
| RG1-2 | FS-2A |
|  | FS-2B |
| ⋮ | ⋮ |
| ⋮ | ⋮ |

*FIG. 10*

UNIT TIME BASIS RESOURCE GROUP ACCESS PRIORITY TABLE

| | | RESOURCE GROUP NAME | | |
|---|---|---|---|---|
| | | RG1-1 | RG1-2 | RG1-3 |
| PRIORITY | 0 | 0 | 0 | 300 |
| | 1 | 0 | 30 | 200 |
| | 2 | 0 | 100 | 0 |
| | 3 | 0 | 150 | 40 |
| | 4 | 50 | 200 | 0 |
| | 5 | 10 | 10 | 0 |
| | 6 | 0 | 0 | 0 |
| | 7 | 200 | 0 | 0 |
| TOTAL | | 260 | 490 | 540 |

FIG. 12

|  |  | RESOURCE GROUP NAME 1401 | | |
|---|---|---|---|---|
|  |  | RG1-1 | RG1-2 | RG1-3 |
| 1402 | PRIPRITY 0 | 0 | 0 | 300 |
|  | 1 | 0 | 30 | 200 |
|  | 2 | 0 | 100 | 0 |
|  | 3 | 0 | 150 | 40 |
|  | 4 | 50 | 200 | 0 |
|  | 5 | 10 | 10 | 0 |
|  | 6 | 0 | 0 | 0 |
|  | 7 | 200 | 0 | 0 |
| 1403 | TOTAL | 260 | 490 | 540 |
| 1404 | POINT | 3 | 2 | 1 |

FIG.14

|  |  | RESOURCE GROUP NAME | | |
|---|---|---|---|---|
|  |  | RG1-1 | RG1-2 | RG1-3 |
| PRIPRITY | 0 | 0 | 0 | 300 (300 × 1) |
| | 1 | 0 | 60 (30 × 2) | 400 (200 × 2) |
| | 2 | 0 | 300 (100 × 3) | 0 |
| | 3 | 0 | 600 (150 × 4) | 160 (40 × 4) |
| | 4 | 250 (50 × 5) | 1000 (200 × 5) | 0 |
| | 5 | 60 (10 × 6) | 60 (10 × 6) | 0 |
| | 6 | 0 | 0 | 0 |
| | 7 | 1600 (200 × 8) | 0 | 0 |
| TOTAL | | 1910 | 2020 | 860 |
| POINT | | 2 | 1 | 3 |

*FIG. 15*

|  |  | RESOURCE GROUP NAME | | |
|---|---|---|---|---|
|  |  | RG1-1 | RG1-2 | RG1-3 |
| 1602 | PRIPRITY 0 | 0 | 0 | 300 (300 × 1) |
|  | 1 | 0 | 120 (30 × 4) | 800 (200 × 4) |
|  | 2 | 0 | 900 (100 × 9) | 0 |
|  | 3 | 0 | 2400 (150 × 16) | 640 (40 × 16) |
|  | 4 | 1250 (50 × 25) | 5000 (200 × 25) | 0 |
|  | 5 | 360 (10 × 36) | 360 (10 × 36) | 0 |
|  | 6 | 0 | 0 | 0 |
|  | 7 | 12800 (200 × 64) | 0 | 0 |
| 1603 | TOTAL | 14410 | 8780 | 1740 |
| 1604 | POINT | 1 | 2 | 3 |

*FIG. 16*

|  |  | RESOURCE GROUP NAME | | |
|---|---|---|---|---|
|  |  | RG1-1 | RG1-2 | RG1-3 |
| 1702 ~ | PRIORITY 0 | 0 | 0 | 0.56 (300×1/540) |
|  | 1 | 0 | 0.12 (30×2/490) | 0.74 (200×2/540) |
|  | 2 | 0 | 0.61 (100×3/490) | 0 |
|  | 3 | 0 | 1.22 (150×4/490) | 0.30 (40×4/540) |
|  | 4 | 0.96 (50×5/260) | 2.04 (200×5/490) | 0 |
|  | 5 | 0.23 (10×6/260) | 0.12 (10×6/490) | 0 |
|  | 6 | 0 | 0 | 0 |
|  | 7 | 6.15 (200×8/260) | 0 | 0 |
| 1703 ~ | TOTAL | 7.34 | 4.11 | 1.60 |
| 1704 ~ | POINT | 1 | 2 | 3 |

*FIG. 17*

| | | RESOURCE GROUP NAME | | |
|---|---|---|---|---|
| | | RG1-1 | RG1-2 | RG1-3 |
| POINT | FUNCTION 1 | 3 | 2 | 1 |
| POINT | FUNCTION 2 | 2 | 1 | 3 |
| POINT | FUNCTION 3 | 1 | 2 | 3 |
| TOTAL | | 6 | 5 | 7 |
| PRIORITY LEVEL | | 2 | 1 | 3 |

*FIG. 18*

FAIL OVER CLUSTER SYSTEM AND FAIL OVER METHOD

CROSS-REFERENCE TO PRIOR APPLICATION

This application relates to and claims priority from Japanese Patent Application No. 2005-78984 filed on Mar. 18, 2005 the entire disclosure of which is incorporated herein by reference.

BACKGROUND OF THE INVENTION

This invention relates to fail over in a cluster system.

Nowadays companies and other organizations' operations rely more heavily than ever on computer systems, and shutdown of a computer system can thus cause a serious damage to the organization. Cluster system is one of technologies developed to avoid such total shutdown of a computer system.

A cluster system is a system composed of plural computers (also called as nodes) that are connected to one another in groups (clusters). Load-balancing systems and fail over systems, for example, are known cluster systems.

A fail over cluster system is a system which uses plural computers to obtain redundancy. For instance, in the case where a server that provides an business application service to client computers is a cluster constituted of two computers, when an operation of the business application that has been processed by one of the two computers shuts down by a failure or the like, the active computer is taken over by the other computer, so the client computers can continue to receive the service.

The client computers view the whole cluster as one computer, and therefore cannot tell which computer is providing the service after the operation is taken over (after the fail over is executed).

If such a fail over cluster system executes fail over without taking into consideration the running state of a fail over computer to which the operation is handed over, the response speed of the fail over computer could be lowered by too much load from the fail over. Techniques with which the order of priority in fail over can be changed according to the running state of a fail over computer have been disclosed (for example, JP 11-353292 A).

SUMMARY OF THE INVENTION

According to JP 11-353292 A, the running state of a fail over computer determines an order of priority in fail over, but no consideration is given to the quality of a service that has been provided to users by a computer shut down from a failure or other reasons. As a result, in some cases, the service to users who demand a relatively lower level of service is resumed before the service to users who demand a higher level of service, thus delaying resumption of the service to the latter users.

This invention has been made in view of the above problems, and it is an object of this invention to provide a cluster system that determines an order of priority in fail over according to demanded service levels.

The invention provides a cluster system coupled to a client computer via a network and including plural nodes which provide services to the client computer, in which a first node of the plural nodes has a priority recognizing processing module, that consults a priority of a frame received from the client computer, and a second node of the plural nodes has a fail over processing module, which performs fail over on plural software resources managed by the first node according to an order of fail over priority that is based on the priority consulted by the priority recognizing processing module of the first node.

The cluster system of this invention determines an order of priority in fail over according to demanded service levels. Therefore, when a computer is shut down from a failure or other reasons, fail over is executed first for users who demand the highest level of service so that the higher the service level is, the quicker the service is resumed.

BRIEF DESCRIPTION OF THE DRAWINGS

FIG. 7 is an explanatory diagram of a VLANID-priority association table according to the embodiment of this invention.

FIG. 9 is an explanatory diagram of a VLANID-service IP address association table according to the embodiment of this invention.

FIG. 10 is an explanatory diagram of a file system-resource group association table according to the embodiment of this invention.

FIG. 12 is an explanatory diagram of a unit-time basis resource group access priority table according to the embodiment of this invention.

FIG. 14 is an explanatory diagram of a weighted access count when a first weighting function is applied in the embodiment of this invention.

FIG. 15 is an explanatory diagram of a weighted access count when a second weighting function is applied in the embodiment of this invention.

FIG. 16 is an explanatory diagram of a weighted access count when a third weighting function is applied in the embodiment of this invention.

FIG. 17 is an explanatory diagram of a weighted access count when a fourth weighting function is applied in the embodiment of this invention.

FIG. 18 is an explanatory diagram of a comprehensive assessment of a priority level according to the embodiment of this invention.

DETAILED DESCRIPTION OF THE PREFERRED EMBODIMENTS

An embodiment of this invention will be described with reference to the accompanying drawings.

Figure 1:
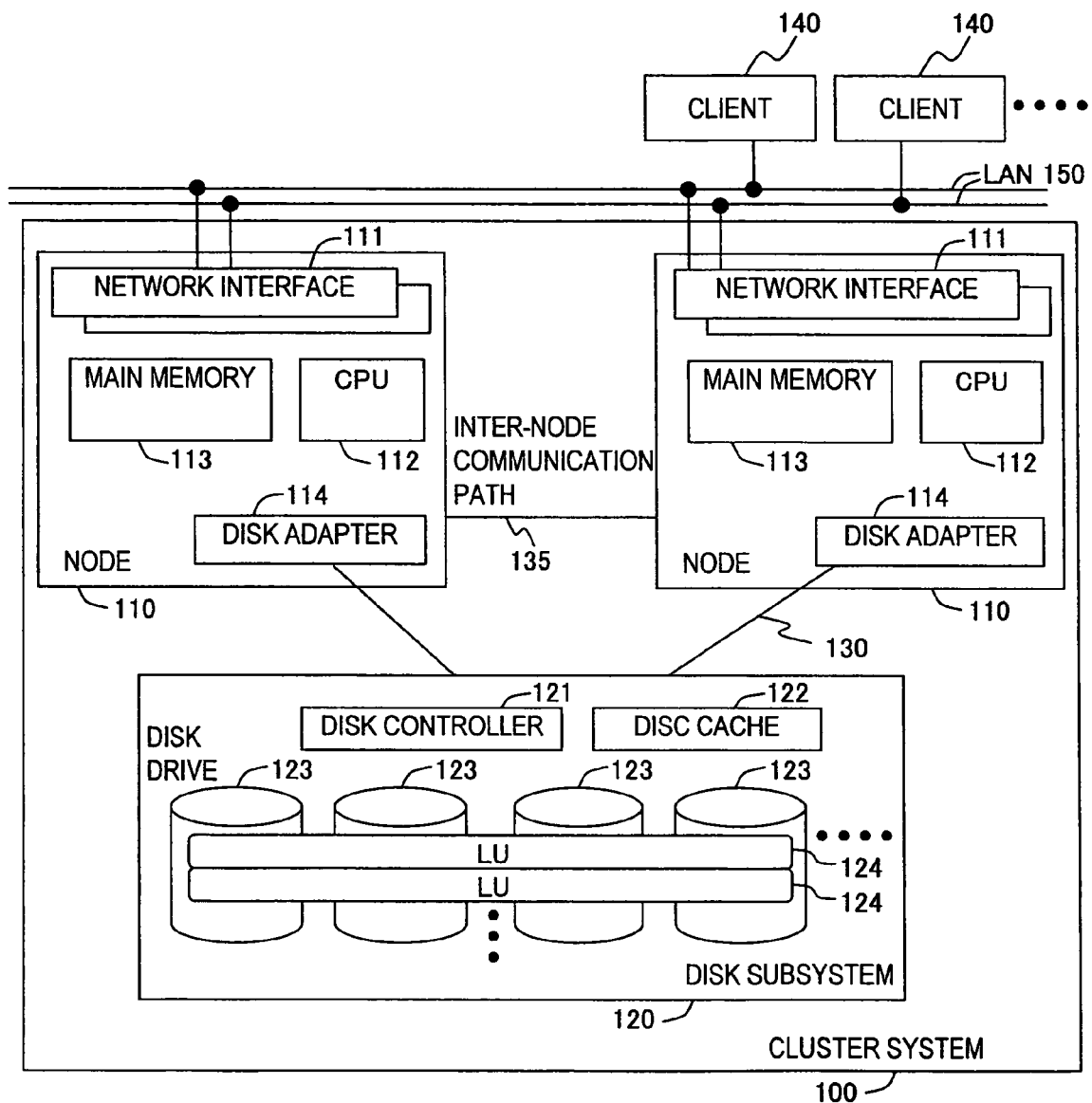
FIG. 1 is a block diagram showing the configuration of a cluster system according to an embodiment of this invention.

FIG. 1 is a block diagram showing the configuration of a cluster system according to this embodiment.

A cluster system 100 of this embodiment is composed of two nodes 110 and a disk subsystem 120. The nodes 110 are connected to the disk subsystem 120 by communication paths 130. The two nodes 110 are connected to each other by an inter-node communication path 135. LANs 150 connect the nodes 110 to clients 140.

The cluster system 100 of this embodiment is a server that provides an business application service to the clients 140. For instance, the cluster system 100 provides the clients 140 access to a file system that is managed by the cluster system 100. In this case, the cluster system 100 corresponds to network storage (NAS: Network Attached Storage) having a cluster configuration. The cluster system 100 can provide any other business application service.

This invention is also applicable to a cluster system that is composed of three or more nodes 110. This embodiment takes as an example the cluster system 100 which is composed of two nodes 110 for explanation purpose.

The clients 140 are computers which access the cluster system 100 via the LANs 150 to receive an business application service provided. In the case where the cluster system 100 is NAS, for example, the clients 140 issue a request to write or read data in a file within a file system provided by the cluster system 100.

Although FIG. 1 shows two clients 140, any number of clients 140 can be connected to the LANs 150 to access the cluster system 100. These clients 140 constitute, as will be described later, a virtual LAN (VLAN).

The LANs 150 are networks to connect the clients 140 to the cluster system 100 of this embodiment and enable them to communicate with each other. In this embodiment, physical layers and data link layers of the LANs 150 follow the IEEE 802.3 standard. In other words, an Ethernet frame (hereinafter simply referred to as frame) is sent and received via the LANs 150. The frame, in this embodiment, contains VLAN tag information, including priority information which follows IEEE 802.1D (IEEE 802.1p), a virtual LAN identifier which follows IEEE 802.1Q, and others. A detailed description will be given later on a frame sent and received in this embodiment.

Any protocol can be used in layers above the data link layers of the LANs 150. In this embodiment, TCP/IP is employed. A frame in this embodiment therefore contains an IP packet.

The nodes 110 are computers each composed of network interfaces 111, a CPU 112, a main memory 113 and a disk adapter 114. In the case where the cluster system 100 is NAS having a cluster configuration, the nodes 110 correspond to NAS heads (also called NAS nodes).

The network interfaces 111 are interfaces connected to the LANs 150 to communicate with the clients 140. In general, each of the nodes 110 can have plural network interfaces 111. In this case, each of the network interfaces 111 can be connected to the LANs 150.

The CPU 112 is a processor to control the operation of the nodes 110. Specifically, the CPU 112 executes programs stored in the main memory 113.

The main memory 113 is, for example, a semiconductor memory. The main memory 113 stores programs executed by the CPU 112 and data referred to by the CPU 112. Examples of programs and stored in the main memory 113 include a program for enabling the cluster system 100 to provide an business application service to the clients 140, a program for fail over, and data necessary to execute these programs. Details of the programs stored in the main memory 113 will be given later.

The disk adapter 114 is an interface connected to the communication paths 130 to communicate with the disk subsystem 120.

Communications by a protocol such as Fibre Channel (FC) or SCSI are carried out over the communication paths 130. The communication paths 130 may be storage area network (SAN).

The two nodes 110 are connected to each other by the inter-node communication path 135. The nodes 110 communicate with each other over the inter-node communication path 135. For instance, the nodes 110 can periodically exchange given signals in heartbeat monitoring to monitor each other and check whether or not the monitored one is running normally.

The disk subsystem 120 is composed of a disk controller 121, a disk cache 122 and disk drives 123.

The disk controller 121 has one or more ports (omitted from the drawing) connected to the communication paths 130 to communicate with the nodes 110 and control the disk subsystem 120. Specifically, the disk controller 121 communicates with the nodes 110 via the communication paths 130 to write data in the disk drives 123, or to read data out of the disk drives 123, as requested by the nodes 110.

The disk cache 122 is, for example, a semiconductor memory, and temporarily stores data to be written in or read out of the disk drives 123.

The disk drives 123 are hard disk drives to store data. The disk subsystem can be provided with as many disk drives 123 as desired. The disk drives 123 may constitute a RAID. FIG. 1 shows four disk drives 123.

The storage areas of the disk drives 123 are divided into any number of logical units (LUs) 124. The LUs 124 are areas handled as logical disk drives. When the disk drives 123 constitute a RAID, each one of the LUs 124 may be made up of storage areas of plural disk drives as shown in FIG. 1. The size of each of the LUs 124 is set arbitrarily.

Although FIG. 1 shows one disk subsystem 120, the cluster system 100 of this embodiment can have more than one disk subsystem 120. In this case, a SAN, for example, are employed as the communication paths 130 to connect the two nodes 110 to more than one disk subsystem 120.

Figure 2:
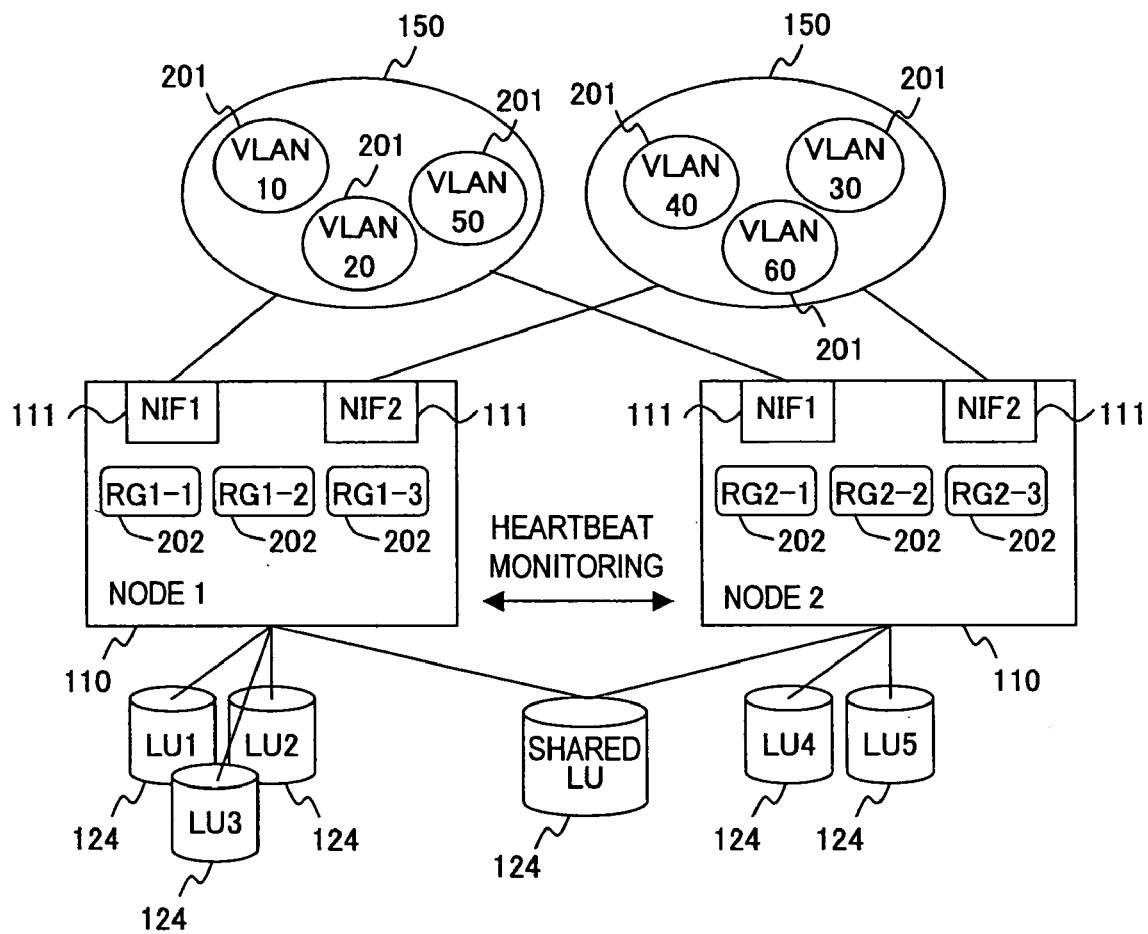
FIG. 2 is a block diagram showing the logical configuration of the cluster system according to the embodiment of this invention.

FIG. 2 is a block diagram showing the logical configuration of the cluster system 100 of this embodiment.

In this embodiment, the clients 140 and other terminals that are connected to the LANs 150 constitute plural virtual LANs (VLANs) 201. In the example of FIG. 2, the terminals constitute 6 virtual LANs 201. The virtual LANs 201 are each identified by a virtual LAN identifier (VLANID). In the example of FIG. 2, the virtual LANs 201 respectively have VLANIDs "10", "20", "30", "40", "50" and "60". In the following description, one of the virtual LANs 201 that has the VLANID "10" is simply referred to as VLAN 10, and the same applies to the rest of the virtual LANs 201.

The cluster system 100 of this embodiment has, as shown in FIG. 1, two nodes 110. Hereinafter, one of the two nodes 110 is referred to as node 1 whereas the other is referred to as node 2.

Each of the nodes 110 has two network interfaces (NIFs) 111. Hereinafter, one of the two NIFs 111 provided in each of the nodes 110 is referred to as NIF 1 whereas the other is referred to as NIF 2.

Of the six virtual LANs 201 described above, the VLAN 10, the VLAN 20 and the VLAN 50 are built within one of the LANs 150 that is connected to NIF 1 of node 1 and NIF 1 of node 2, whereas the VLAN 30, the VLAN 40 and the VLAN 60 are built within one of the LANs 150 that is connected to NIF 2 of node 1 and NIF 2 of node 2.

The cluster system 100 of this embodiment has an arbitrary number of LUs 124. FIG. 2 shows an example of 6 LUs 124. Three of the six LUs 124 whose identifiers are "LU1", "LU2" and "LU3", respectively, are logically connected to node 1. In other words, node 1 can access these three LUs 124. Two of the LUs 124 whose identifiers are "LU4" and "LU5", respectively, are logically connected to node 2. The last of the LUs 124 is a shared LU 124, which is logically connected to both node 1 and node 2. In other words, both node 1 and node 2 are allowed to access the shared LU 124.

Each of the nodes 110 manages an arbitrary number of resource groups 202. In the example FIG. 2, the nodes 110 each manage three resource groups 202.

The resource groups 202 are aggregations of software resources provided to the VLANs by the nodes 110. The resource groups 202 of this embodiment are groups of file systems provided to the VLANs by the nodes 110 and service IP addresses for providing the file systems. Details of the resource groups 202 will be given later.

The names of the resource groups 202 (resource group names) that are managed by node 1 are "RG 1-1", "RG 1-2" and "RG 1-3". The resource group names of the resource groups 202 that are managed by node 2 are "RG 2-1", "RG 2-2" and "RG 2-3". Hereinafter, one of the resource groups 202 that has a resource group name of "RG 1-1" is simply referred to as "RG 1-1", and the same applies to the rest of the resource groups 202.

File systems included in RG 1-1, RG 1-2 and RG 1-3 which are managed by node 1 are stored in any one of LU1, LU2 and LU3 which are accessed by node 1. File systems included in RG 2-1, RG 2-2 and RG 2-3 which are managed by node 2 are stored in either LU4 or LU5 that node 2 accesses.

Node 1 and node 2 perform heartbeat monitoring on each other. In other words, node 1 and node 2 send given signals (heartbeat signals) to each other at given intervals. While one of the nodes 110 keeps receiving heartbeat signals sent from the other of the nodes 110 at given intervals, it is judged that the other node is working normally. When heartbeat signals stops arriving, it is judged that a failure has occurred in the other of the nodes 110.

Figure 3:
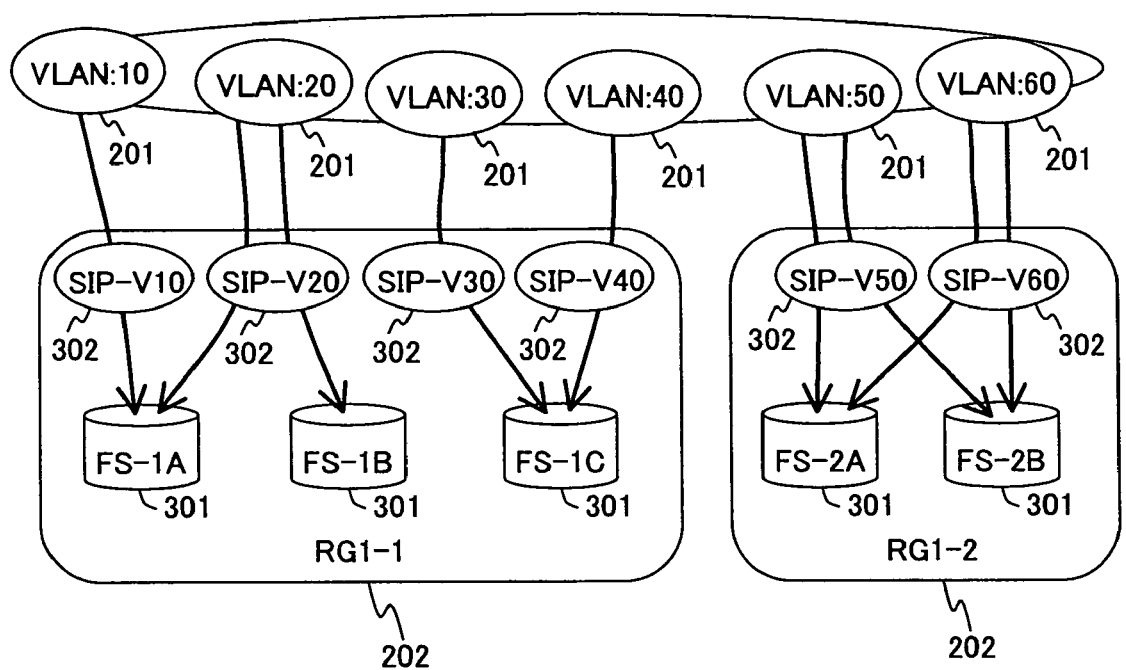
FIG. 3 is an explanatory diagram of resource groups which are managed by the cluster system according to the embodiment of this invention.

FIG. 3 is an explanatory diagram of the resource groups 202 managed by the cluster system 100 of this embodiment. FIG. 3 shows an example of RG 1-1 and RG 1-2.

The resource groups in FIG. 3 are five file systems 301 and six service IP addresses 302 to be provided to the virtual LANs 201.

Each of the file systems 301 is identified by a file system name. The five file systems 301 in FIG. 3 respectively have file system names "FS-1A", "FS-1B", "FS-1C", "FS-2A" and "FS-2B". Hereinafter, one of the file systems 301 that has the file system name "FS-1A" is simply referred to as "FS-1A", and the same applies to the rest of the file systems 301.

In the example of FIG. 3, FS-1A, FS-1B and FS-1C are included in RG 1-1. FS-1A is provided to VLAN 10 and VLAN 20. FS-1B is provided to VLAN 20. FS-1C is provided to VLAN 30 and VLAN 40. FS-2A and FS-2B are included in RG 1-2. FS-2A and FS-2B are both provided to VLAN 50 and VLAN 60.

The six service IP addresses 302 in FIG. 3 are "SIP-V10", "SIP-V20", "SIP-V30", "SIP-V40", "SIP-V50" and "SIP-V60". Whereas "SIP-V10" used in this embodiment for explanation is a symbol, actual service IP addresses 302 are numerical values such as "172. 16. 2. 3"

In the example of FIG. 3, SIP-V10, SIP-V20, SIP-V30 and SIP-V40 are included in RG 1-1. SIP-V10 is used to provide FS-1A to VLAN 10. SIP-V20 is used to provide FS-1A and FS-1B to VLAN 20. SIP-V30 is used to provide FS-1C to VLAN 30. SIP-V40 is used to provide FS-1C to VLAN 40.

SIP-V50 and SIP-V60 are included in RG 1-2. SIP-V50 is used to provide FS-2A and FS-2B to VLAN 50. SIP-V60 is used to provide FS-2A and FS-2B to VLAN 60.

The resource groups 202 may contain other software resources than the file systems 301 and the service IP addresses 302.

Figure 4:
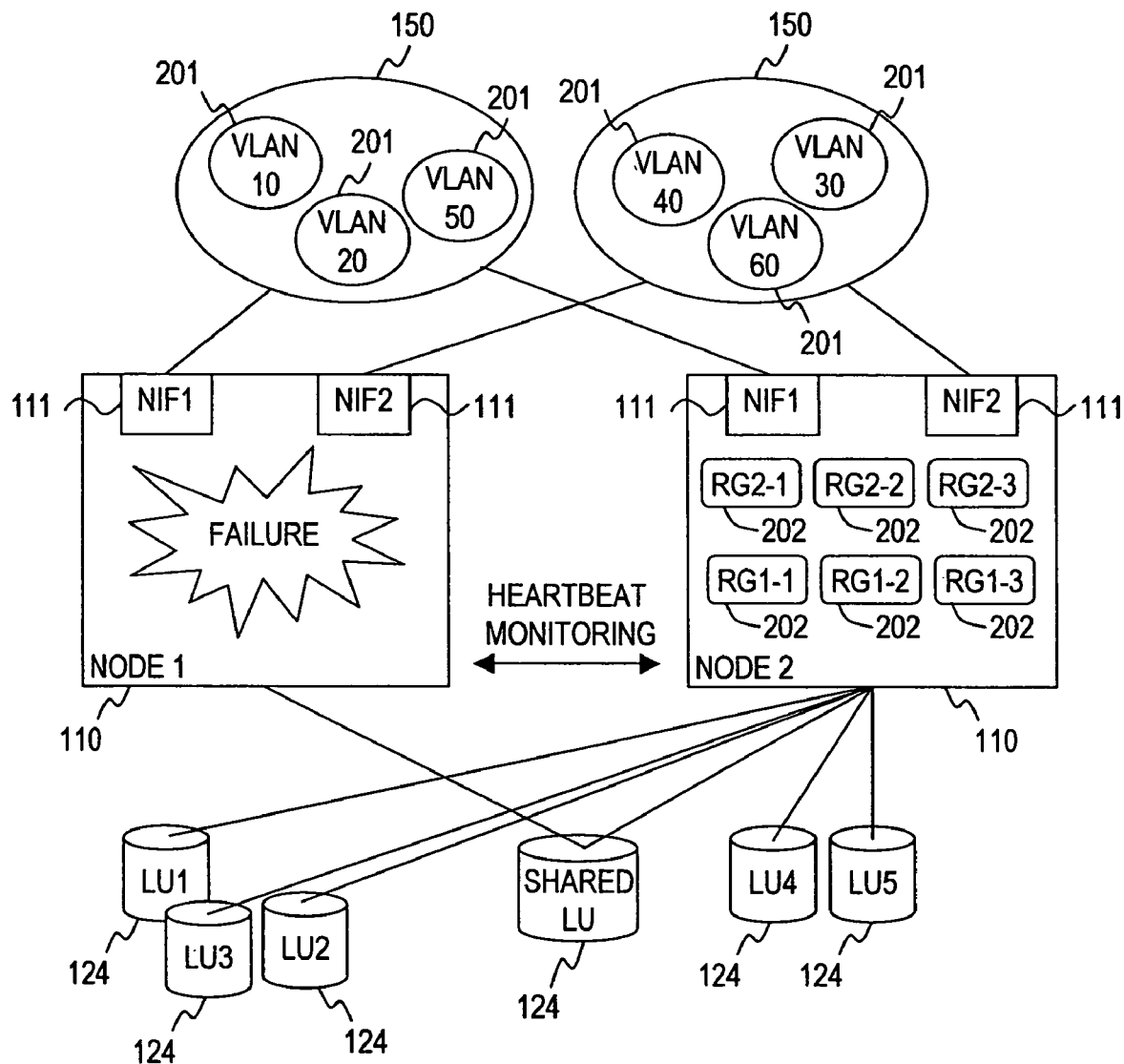
FIG. 4 is an explanatory diagram of fail over executed in the cluster system according to the embodiment of this invention.

FIG. 4 is an explanatory diagram of fail over executed in the cluster system 100 according to the embodiment of the invention.

FIG. 4 shows a state after a failure occurs in node 1 of FIG. 2 and fail over is executed.

When heartbeat signals from node 1 stops arriving, node 2 judges that a failure has occurred in node 1. At this point, the clients 140 of the virtual LANs 201 cannot access the file systems 301 that are included in RG 1-1, RG 1-2 and RG 1-3. Node 2 takes over management of RG 1-1, RG 1-2 and RG 1-3 to provide these currently inaccessible file systems 301 to the virtual LANs 201 in place of node 1.

Specifically, such processing is executed as connecting LU1, LU2 and LU3, which have been connected to node 1, to node 2 and mounting the file system 301 that are included in RG 1-1, RG 1-2 and RG 1-3 to node 2.

As a result, the clients 140 of the virtual LANs 201 can now access via node 2 the file systems 301 that are included in RG 1-1, RG 1-2 and RG 1-3.

The fail over procedure includes, as mentioned above, processing of mounting the file systems 301 to node 2 as a fail over node. As the number of the file systems 301 that are the targets of the fail over processing increases, the time to complete fail over (namely, the time that takes until all of the file systems 301 that are the targets of the fail over processing are made available again) is prolonged. It is therefore desirable to execute fail over first for one of the resource groups 202 that needs to resume providing a service faster than any other resource groups 202.

The cluster system 100 of this embodiment consults a priority (will be described later) contained in a frame which is sent and received over the LANs 150 to determine on which level in an order of priority for fail over each resource group is, and executes fail over according to the order of priority.

Shown in FIG. 4 as an example is a case where a failure occurs in node 1, but this invention is also applicable to such cases as shutting down node 1 on schedule for maintenance purposes.

Figure 5:
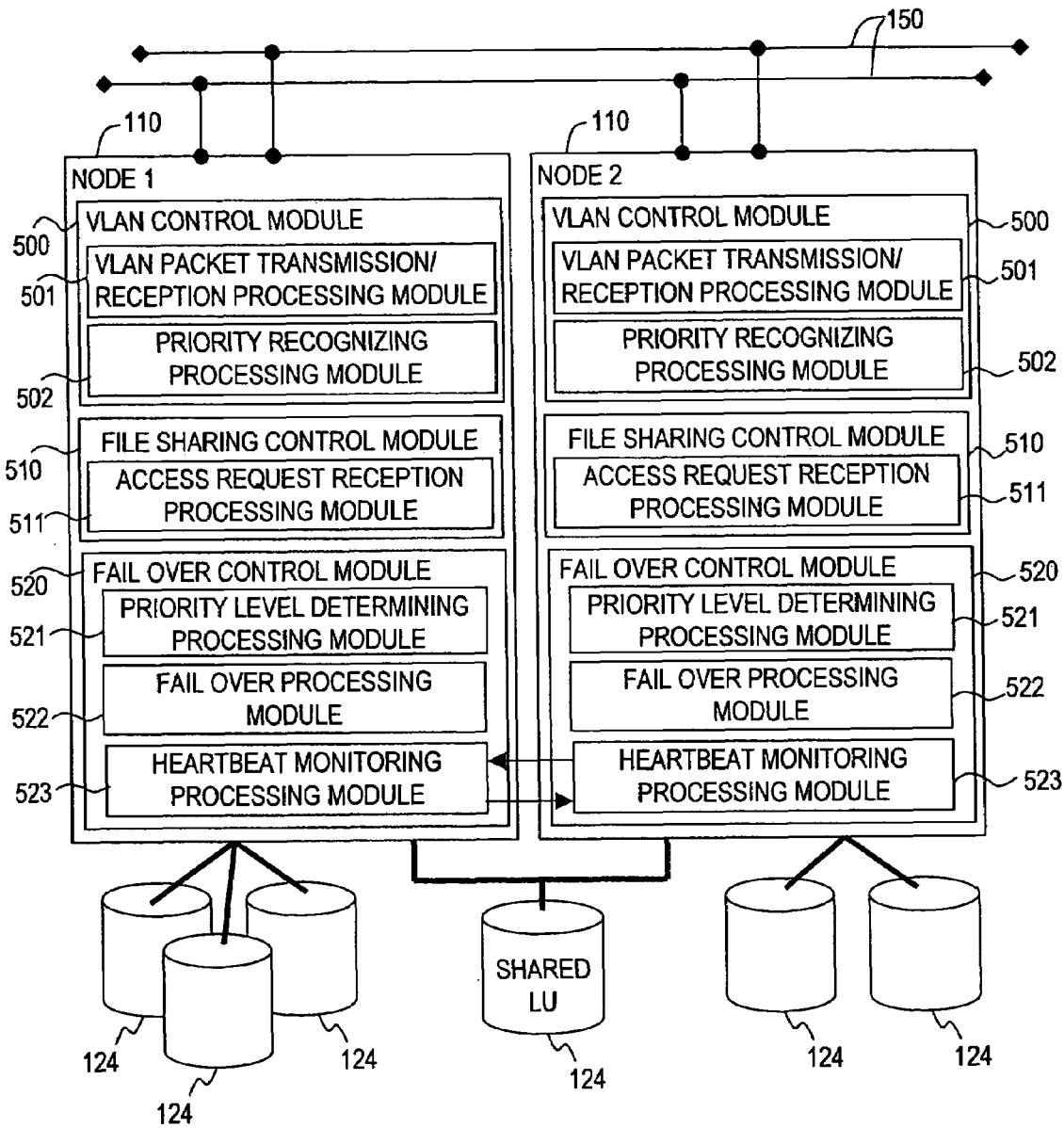
FIG. 5 is a function block diagram of nodes which constitute the cluster system according to the embodiment of this invention.

FIG. 5 is a function block diagram of the nodes 110 which constitute the cluster system 100 of this embodiment.

Each of the nodes 110 of this embodiment has, at least, a VLAN control module 500, a file sharing control module 510 and a fail over control module 520. The modules are programs stored in the main memory 113 and executed by the CPU 112.

The VLAN control module 500 contains a VLAN packet transmission/reception processing module 501 and a priority recognizing processing module 502. The processing modules correspond to sub-programs of the VLAN control module 500.

Figure 6:
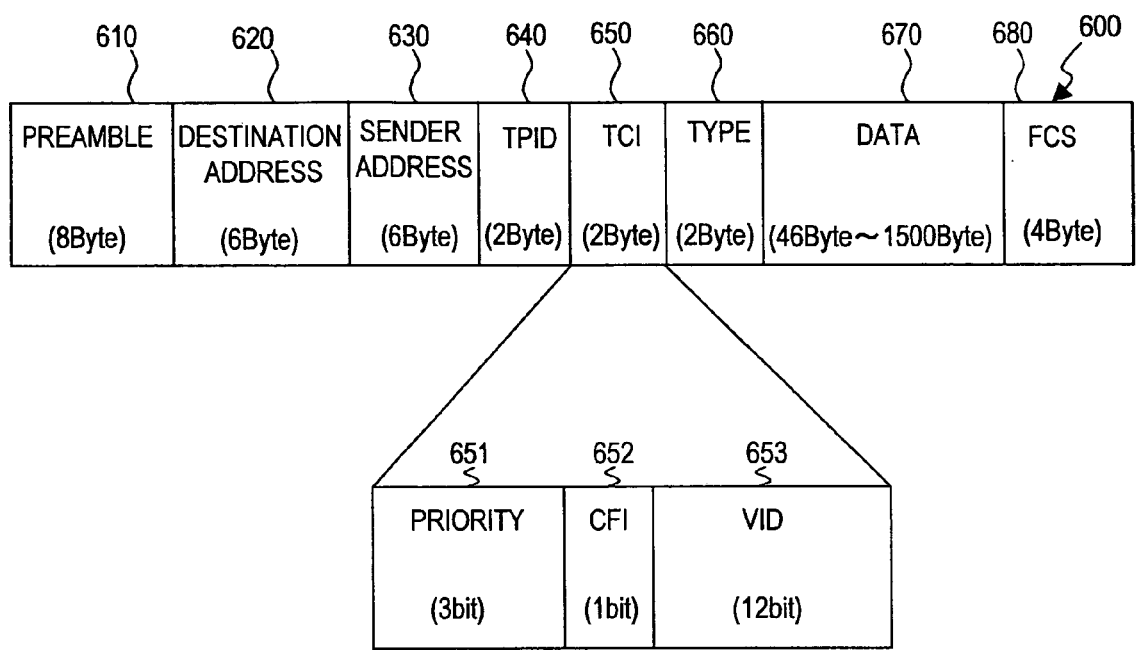
FIG. 6 is an explanatory diagram of a frame which is sent and received over a LAN according to the embodiment of this invention.
Figure 19:
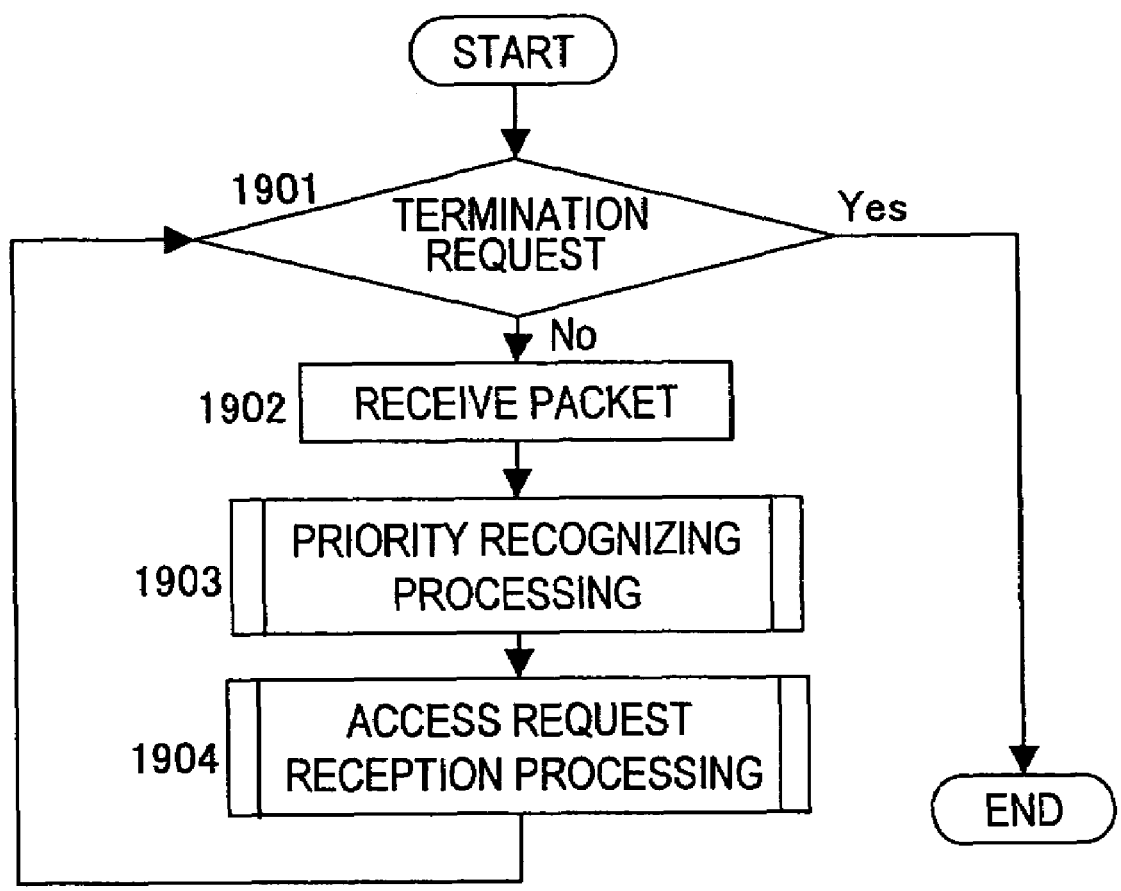
FIG. 19 is a flow chart of VLAN packet reception processing according to the embodiment of this invention.
Figure 20:
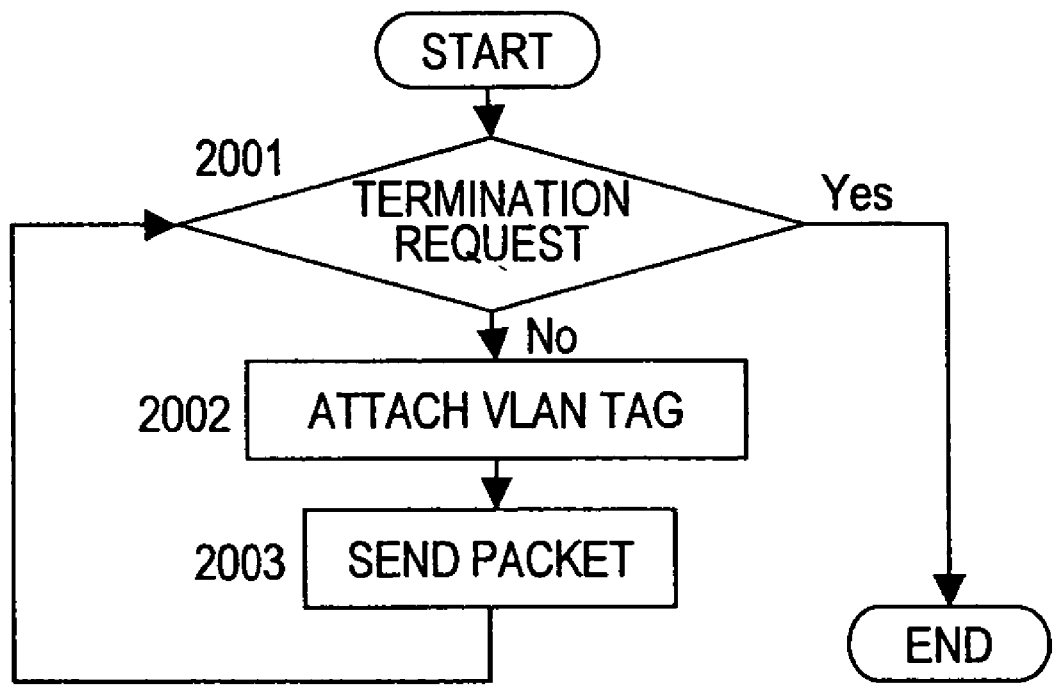
FIG. 20 is a flow chart of VLAN packet transmission processing according to the embodiment of this invention.

The VLAN packet transmission/reception processing module 501 sends and receives a tagged packet. Specifically, the VLAN packet transmission/reception processing module 501 receives a packet (a frame containing the packet, to be exact) with tag information attached by the IEEE 802.1Q standard, and sends, in response to the clients 140, a packet with a received VLANID attached. With reference to FIG. 6, details of a frame (including tag information and VLANID) following IEEE 802.1Q will be described. With reference to FIGS. 19 and 20, steps of processing executed by the VLAN packet transmission/reception processing module 501 will be described in detail.

Figure 21:
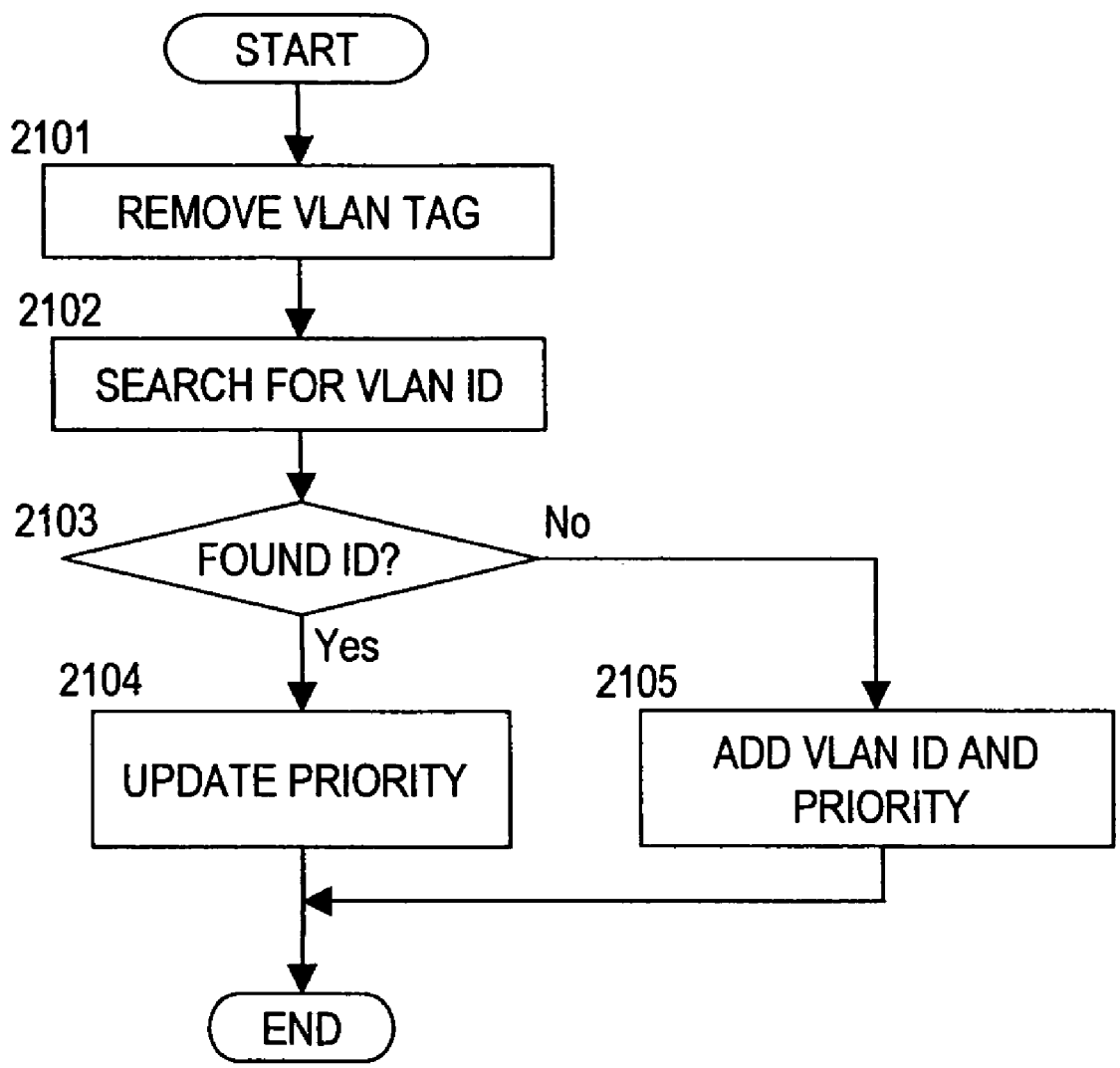
FIG. 21 is a flow chart of priority recognizing processing according to the embodiment of this invention.

The priority recognizing processing module 502 consults a VLANID and a priority in a tagged packet received, and creates a table used to manage the association between the two. With reference to FIG. 7, details of the table created by the priority recognizing processing module 502 will be given. With reference to FIG. 21, steps of processing executed by the priority recognizing processing module 502 will be described in detail.

Figure 8:
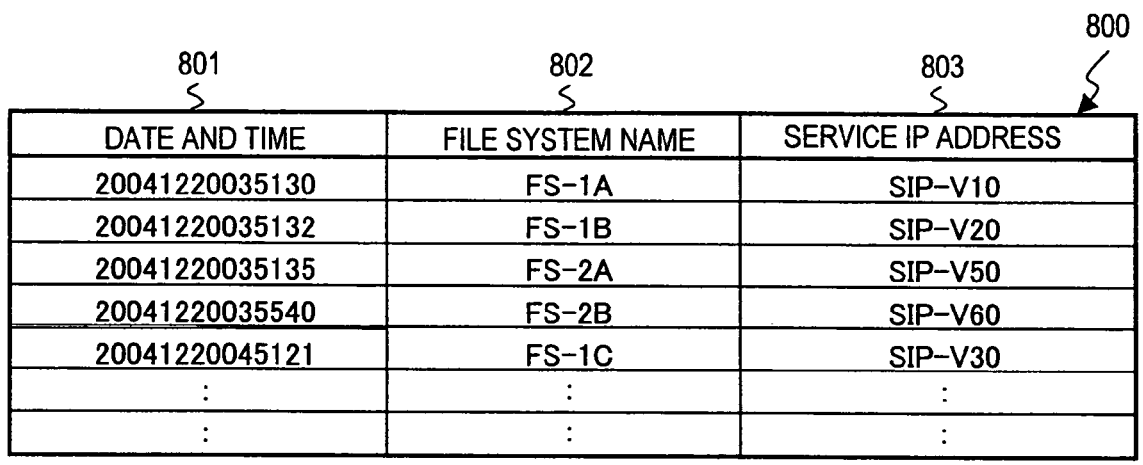
FIG. 8 is an explanatory diagram of a file system access information table according to the embodiment of this invention.
Figure 22:
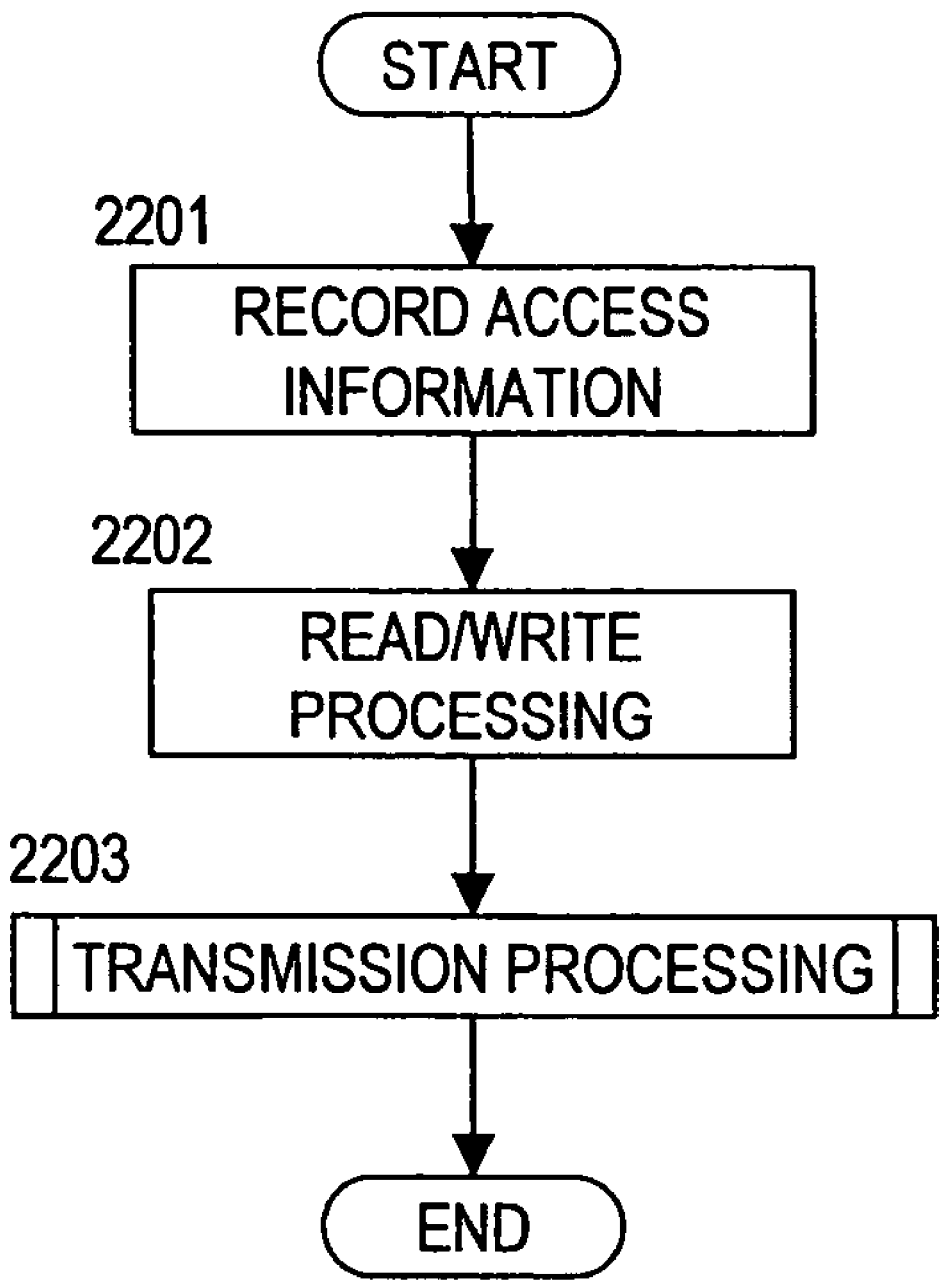
FIG. 22 is a flow chart of access request reception processing according to the embodiment of this invention.

The file sharing control module 510 contains an access request reception processing module 511. The access request reception processing module 511 corresponds to a sub-program of the file sharing control module 510. The access request reception processing module 511 records the date and time of reception of a request for access to the file systems 301, and the service IP addresses 302 used in the access. With reference to FIG. 8, details of (a table of) information recorded by the access request reception processing module 511 will be given. With reference to FIG. 22, steps of processing executed by the access request reception processing module 511 will be described in detail.

The fail over control module 520 contains a priority level determining processing module 521, a fail over processing module 522, and a heartbeat monitoring processing module 523. The processing modules correspond to sub-programs of the fail over control module 520.

Figure 23:
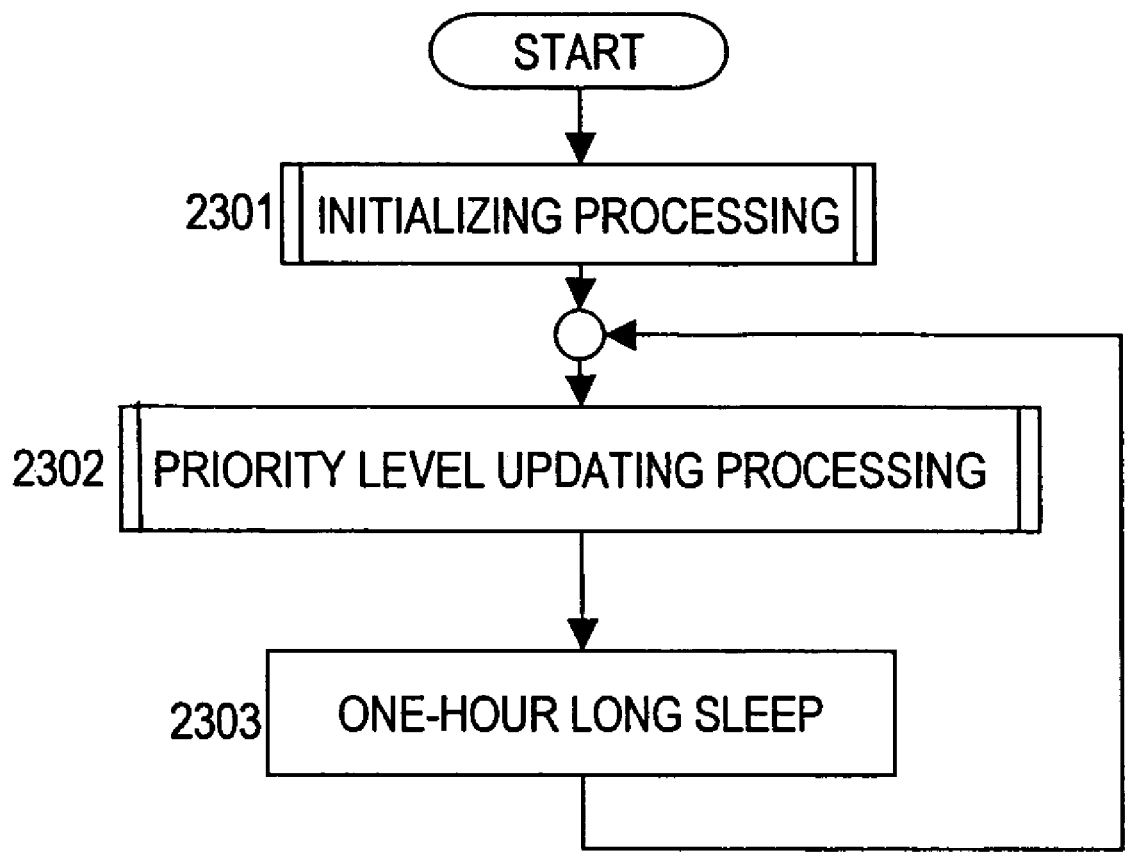
FIG. 23 is a flow chart of priority level determining processing according to the embodiment of this invention.
Figure 24:
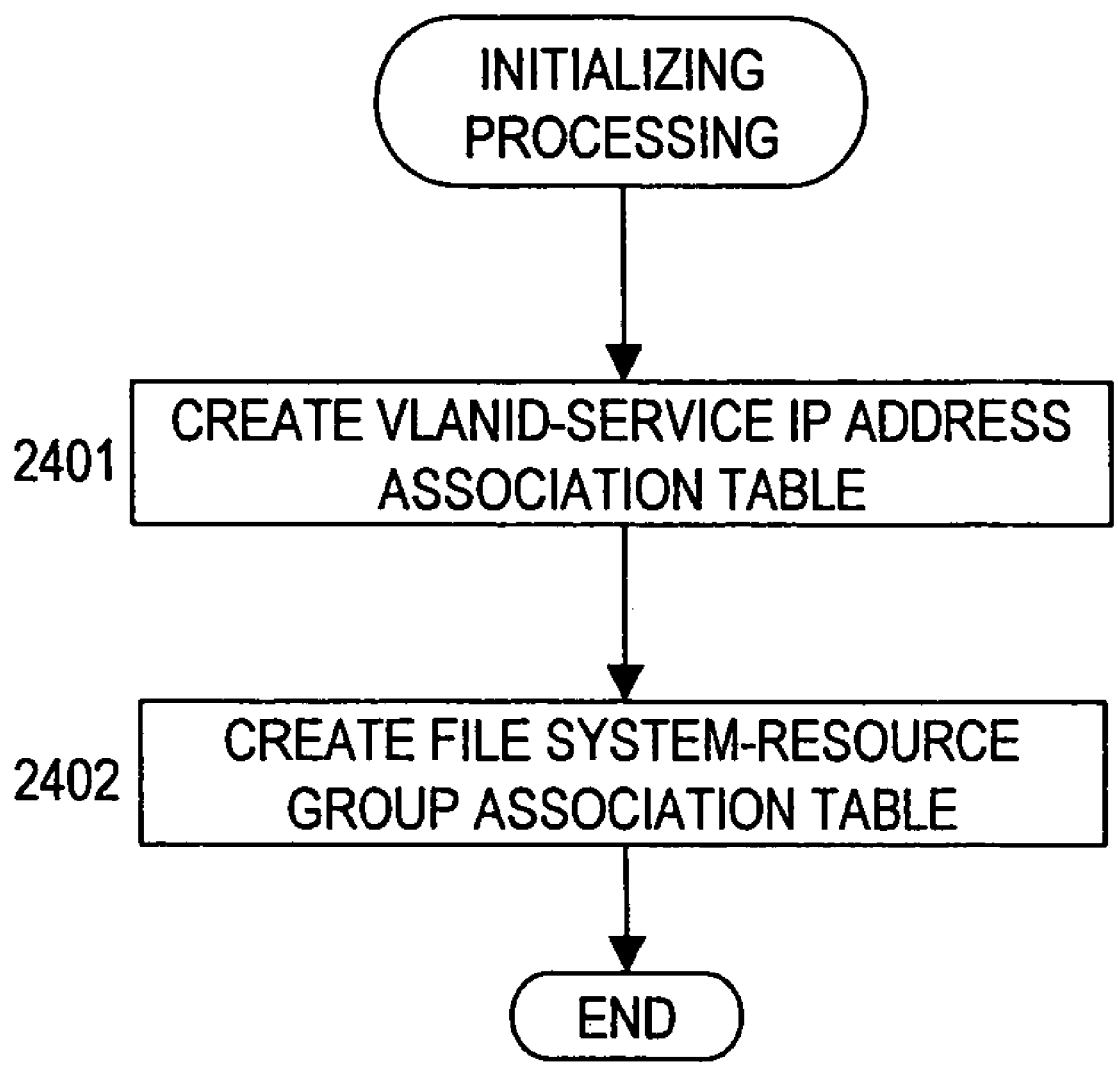
FIG. 24 is a flow chart of initializing processing according to the embodiment of this invention.
Figure 25:
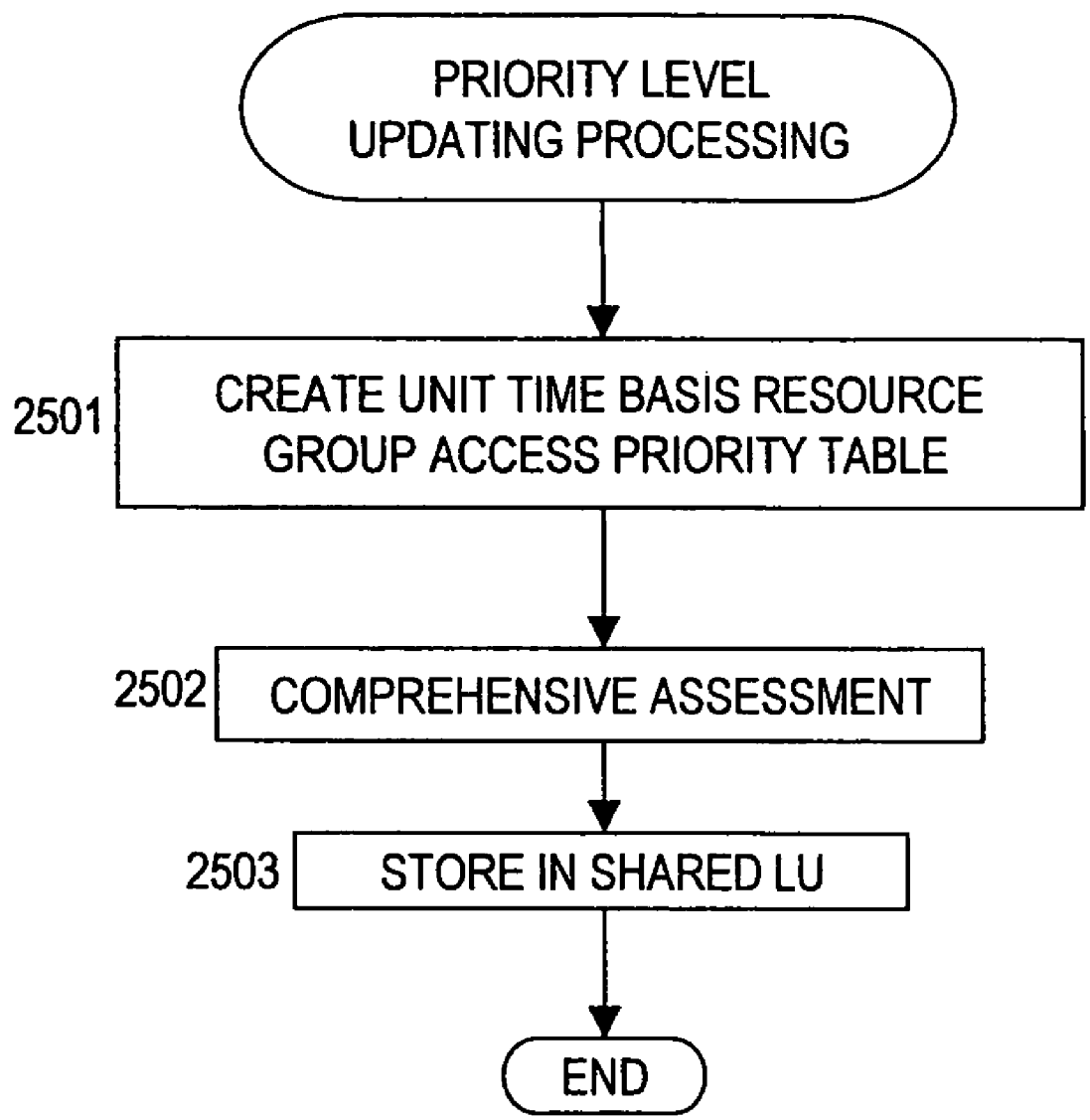
FIG. 25 is a flow chart of priority level updating processing according to the embodiment of this invention.

The priority level determining processing module 521 creates, based on environment setting information (omitted from the drawing), a table showing the association between VLANIDs and the service IP addresses 302 and a table showing the association between the resource groups 202 and the file systems 301. Consulting these tables, the priority level determining processing module 521 determines on which level in an order of priority for fail over each of the resource groups 202 is. The priority level determining processing module 521 stores the determined order of priority in the shared LU 124. With reference to FIGS. 9 to 18, details of the tables created by the priority level determining processing module 521 and the order of priority determined by the priority determining processing module 521 will be given. With reference to FIGS. 23 to 25, processing executed by the priority level determining processing module 521 will be described in detail.

Figure 26:
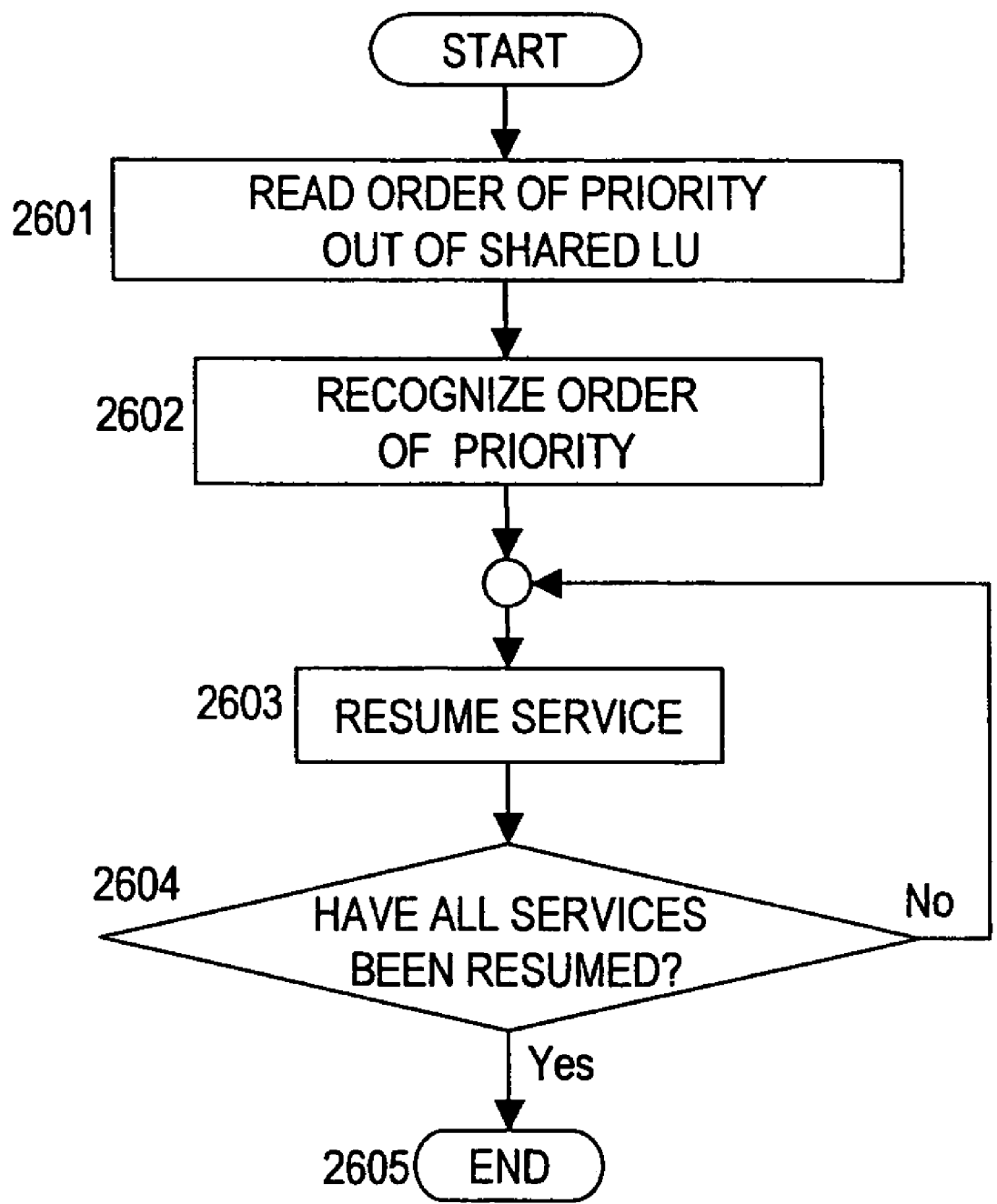
FIG. 26 is a flow chart of fail over processing according to the embodiment of this invention.

The fail over processing module 522 executes fail over according to the order of priority determined by the priority level determining processing module 521. Specifically, when the other of the nodes 110 is shut down from a failure or other reasons, the fail over processing module 522 consults an order of priority that has been stored in the shared LU 124 by the priority determining processing module 521 of the one of the nodes 110 that is shut down. Following this order of priority, the fail over processing module 522 executes fail over for the resource groups 202 to resume services sequentially. With reference to FIG. 26, processing executed by the fail over processing module 522 will be described in detail.

The heartbeat monitoring processing module 523 executes heartbeat monitoring. Specifically, the heartbeat monitoring processing module 523 of node 1 sends given heartbeat signals to node 2 at a given timing (for example, at a given time of day or given time intervals). The heartbeat monitoring processing module 523 of node 1 also receives heartbeat signals sent from the heartbeat monitoring processing module 523 of node 2. When heartbeat signals from the heartbeat monitoring processing module 523 of node 2 stops arriving (in other words, when heartbeat signals fail to arrive at node 1 at a given timing), the heartbeat monitoring processing module 523 of node 1 judges that a failure has occurred in node 2.

Similarly, the heartbeat monitoring processing module 523 of node 2 sends heartbeat signals to node 1 at a given timing while receiving heartbeat signals from Node 1 to judge whether or not a failure has occurred in node 1.

FIG. 6 is an explanatory diagram of a frame 600 sent and received over the LANs 150 of this embodiment.

As has been described, the frame 600 sent and received over the LANs 150 of this embodiment follows the standards of IEEE 802.3, IEEE 802.1D (IEEE 802.1p), and IEEE 802.1Q.

The frame 600 is composed of eight fields, which respectively store a preamble 610, a destination address 620, a sender address 630, a tag protocol identifier (TPID) 640, tag control information (TCI) 650, a type 660, data 670 and a frame check sequence (FCS) 680. The preamble 610 is stored in the field at the head of the frame and the FCS 680 is stored in the field at the tail of the frame.

The preamble 610 is an eight-byte signal used by interfaces (e.g., the network interfaces 111) connected to the LANs 150 as an indicator of the start of the frame 600. The preamble 610 thus enables the interfaces to time synchronization.

The destination address 620 is a six-byte media access control address (MAC address) of an interface to which the frame 600 is to be sent.

The sender address 630 is a six-byte MAC address of an interface from which the frame 600 is sent.

The TPID 640 is composed of two bytes. In this embodiment where the virtual LANs 201 are supported, the TPID 640 is a fixed value and set to 0x8100.

The TCI 650 is two-byte tag control information (VLAN tag). The TCI 650 contains a three-bit priority 651, a one-bit Canonical Format Indicator (CFI) 652, and a twelve-bit virtual LAN identifier (VID) 653.

The priority 651 is an IEEE 802.1p value indicating a transmission priority level of the frame 600, and is used to achieve QoS (Quality of Service). The priority 651 is one of eight values ranging from "0" to "7", and a larger value means a higher priority level of the frame 600. In this embodiment, the priority 651 is consulted to determine an order of priority for the resource groups 202 in fail over.

The CFI 652 indicates whether there is a routine information field or not.

The VID 653 is a unique identifier assigned to each of the virtual LANs 201, which are connected to the cluster system 100. The VID 653 can take a value chosen from "0" up to and including "4095", but values from "1" through "4094" are used as the identifiers of the virtual LANs 201. Accordingly, the VID 653 can be used to identify 4094 virtual LANs 201 at maximum.

The VID 653 corresponds to the VLANID described with reference to FIG. 2.

The type 660 is an identifier of an upper layer protocol stored in the field of the data 670. For instance, when the stored upper layer protocol is Internet Protocol Version 4 (IPv4), the frame 600 has 0x0800 as the type 660.

The data 670 is data transmitted by the frame 600 (so-called payload). The data 670 stored in the frame 600 is 46 bytes at minimum and 1500 bytes at maximum. Since TCP/IP is employed in this embodiment, an IP packet is stored as the data 670.

The FCS 680 is a four-byte cyclic redundancy check (CRC) calculated from the field of the destination address 620, the sender address 630, the TPID 640, the TCI 650, the type 660 and the data 670 in the frame 600.

Next, various tables created by the nodes 110 will be described. The tables are used to determine an order of priority in fail over for the resource groups 202 managed by the nodes 110.

The following description takes as an example the tables created by node 1. When a failure occurs in node 1, node 2 executes fail over according to an order of priority that is determined based on those tables.

Node 1 may store the tables in either the main memory 113 or the shared LU 124.

Node 2 creates similar tables. An order of priority that is determined based on the tables created by node 2 is consulted by node 1 when a failure occurs in node 2.

FIG. 7 is an explanatory diagram of a VLANID-priority association table according to this embodiment.

A VLANID-priority association table 700 is created by the priority recognizing processing module 502 inside the VLAN control module as shown in FIG. 21.

The VLANID-priority association table 700 stores a VLANID 701 of the sender of the frame 600 that is received by node 1, and a priority 702 of the received frame 600. Specifically, the value of the VID 653 of the received frame 600 is stored as the VLANID 701, and the value of the priority 651 of this frame 600 is stored as the priority 702.

In the example of FIG. 7, the value of the priority 702 that is associated with the value "10" of the VLANID 701 is "7". This means that "7" is the value of the priority 651 of the frame 600 that is received from one of the virtual LANs 201 whose VLANID 701 (i.e., the VID 653) is "10" (the sender is VLAN 10). Similarly, the values of the priority 702 that are associated with the values "20", "30", "40", "50" and "60" of the VLANID 701 are "5", "4", "2", "2" and "3", respectively. This means that "5" is the value of the priority 651 of the frame 600 received from VLAN 20, that "4" is the value of the priority 651 of the frame 600 received from VLAN 30, that "2" is the value of the priority 651 of the frame 600 received from VLAN 40, that "2" is the value of the priority 651 of the frame 600 received from VLAN 50, and that "3" is the value of the priority 651 of the frame 600 received from VLAN 60.

When the value of the priority 651 of the frame 600 newly received from one of the virtual LANs 201 differs from the value received from this virtual LAN before, the priority recognizing processing module 502 updates the value of the priority 702 with the newly received value of the priority 651. For instance, in the case where the frame 600 newly received from VLAN 10 has "1" as the priority 651 in the example of FIG. 7, the priority recognizing processing module 502 updates the value of the priority 702 that is associated with the value "10" of the VLANID 701 from "7" to "1" as shown in FIG. 21.

FIG. 8 is an explanatory diagram of a file system access information table according to this embodiment.

A file system access information table 800 is created by the access request reception processing module 511 inside the file sharing control module 510 as shown in FIG. 22.

The file system access information table 800 stores, for each access made to node 1, a date and time 801, which is the date and time of reception of the access request, a file system name 802, which is the name of the file system accessed, and a service IP address 803, which is the service IP address used to access the file system. In this embodiment, an access request to node 1 is sent and received as the frame 600, and the date and time 801 is therefore the date and time when node 1 receives the frame 600.

In the example of FIG. 8, the entries of the file system name 802 and the service IP address 803 that are associated with "20041220035130" of the date and time 801 are "FS-1A" and "SIP-V10", respectively. This means that node 1 has received, at 3:51:30 a.m. on Dec. 20, 2004, a request to access one of the file systems 301 whose file system name is "FS-1A" at one of the service IP addresses 302 that is denoted by "SIP-V10".

Similarly, in the example of FIG. 8, node 1 has received, at 3:51:32 a.m. on Dec. 20, 2004, a request to access FS-1B at SIP-V20, at 3:51:35 a.m. on Dec. 20, 2004, a request to access FS-2A at SIP-V50, at 3:55:40 a.m. on Dec. 20, 2004, a request to access FS-2B at SIP-V60, and, at 4:51:21 a.m. on Dec. 20, 2004, a request to access FS-1C at SIP-V30.

Thereafter, each time node 1 receives an access request, the access request reception processing module 511 keeps adding, to the file system access information table 800, the date and time 801 of reception of the access request, the file system name 802 and the service IP address 803 as shown in FIG. 22.

FIG. 9 is an explanatory diagram of a VLANID-service IP address association table according to this embodiment.

A VLANID-service IP address association table 900 is created by the priority level determining processing module 521 inside the fail over control module 520 as shown in FIG. 24.

The VLANID-service IP address association table 900 stores, as a VLANID 901, IDs of the virtual LANs 201 accessing the file systems 301 that are managed by node 1 and, as a service IP address 902, service IP addresses used by these virtual LANs 201 to access these file systems 301.

When the virtual LANs 201 are associated with the service IP addresses 302 in the manner shown in FIG. 3, the VLANID-service IP address association table 900 is as shown in FIG. 9. Specifically, VLAN 10, VLAN 20, VLAN 30, VLAN40, VLAN 50 and VLAN 60 are associated with SIP-V10, SIP-V20, SIP-V30, SIP-V40, SIP-V50 and SIP-V60, respectively.

In the case where node 1 is to provide services to more virtual LANs 201 at more service IP addresses 302, the VLANIDs of the additional virtual LANs 201 and the additional service IP addresses 302 are stored as the VLANID 901 and the service IP address 902 in the VLANID-service IP address association table 900.

Usually, when node 1 is initialized, the priority level determining processing module 521 consults the environment setting information (omitted from the drawing) to create the VLANID-service IP address association table 900, and does not update the VLANID-service IP address association table 900 once it is created. However, when node 1 is to start providing a service to a new virtual LAN, or when the association between the virtual LANs 201 and the service IP addresses 302 is changed, or when other similar situations arise, the priority level determining processing module 521 updates the VLANID-service IP address association table 900.

FIG. 10 is an explanatory diagram of a file system-resource group association table according to this embodiment.

A file system-resource group association table 1000 is created by the priority level determining processing module 521 inside the fail over control module 520 as shown in FIG. 24.

The file system-resource group association table 1000 stores, as a resource group name 1001, the names of the resource groups 202 that are managed by node 1 and, as a file system name 1002, the names of the file systems 301 that are included in these resource groups 202.

When node 1 of this embodiment manages the resource groups 202 shown in FIG. 3, the file system-resource group association table 1000 is as shown in FIG. 10. Specifically, "RG 1-1," as the resource group name 1001 is associated with FS-1A, FS-1B and FS-1C as the file system name 1002, and "RG 1-2" as the resource group name 1001 is associated with FS-2A and FS-2B as the file system name 1002.

In the case where node 1 has more resource groups 202 and file systems 301, the names of the additional resource groups 202 and file systems 301 are stored as the resource group name 1001 and as the file system name 1002 in the file system-resource group association table 1000.

Usually, when node 1 is initialized, the priority level determining processing module 521 consults the environment setting information (omitted from the drawing) to create the file system-resource group association table 1000, and does not update the file system-resource group association table 1000 once it is created. However, when new resource groups 202 are added to node 1, or when file systems 301 are added to or removed from the resource groups 202, or when other similar situations arise, the priority level determining processing module 521 updates the file system-resource group association table 1000.

Figure 11:
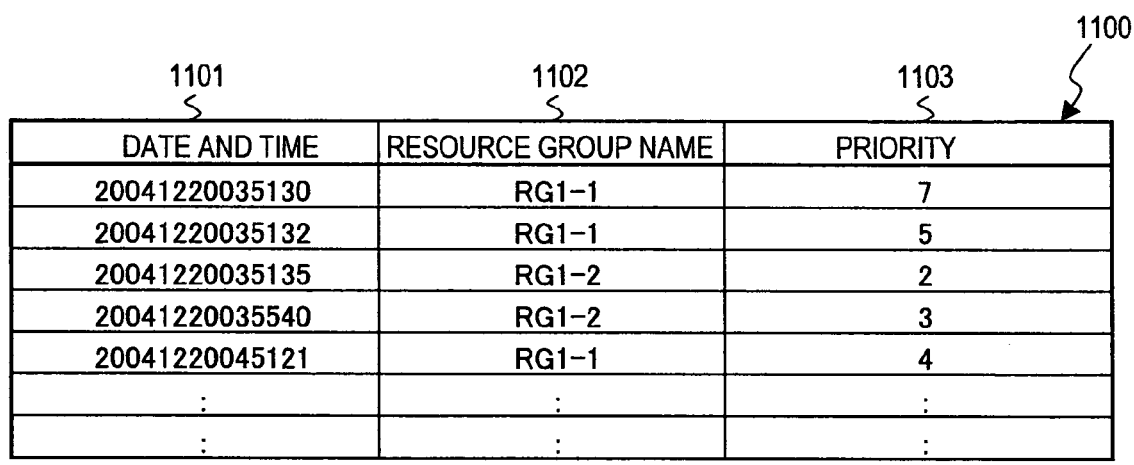
FIG. 11 is an explanatory diagram of an access-to-access basis resource group access priority table according to the embodiment of this invention.

FIG. 11 is an explanatory diagram of an access-to-access basis resource group access priority table according to this embodiment.

An access-to-access basis resource group access priority table 1100 is created by the priority level determining processing module 521 inside the fail over control module 520. To create the access-to-access basis resource group access priority table 1100, the priority level determining processing module 521 consults the VLANID-priority association table 700 of FIG. 7, the file system access information table 800 of FIG. 8, the VLANID-service IP address association table 900 of FIG. 9 and the file system-resource group association table 1000 of FIG. 10.

The access-to-access basis resource group access priority table 1100 stores, for each access made to node 1, a date and time 1101 of the access, a resource group name 1102 of the resource group accessed, and a priority 1103 of the access.

The date and time 1101 corresponds to the date and time 801 of the file system access information table 800.

The resource group name 1102 is retrieved by consulting the file system name 802 of the file system access information table 800 and the file system-resource group association table 1000.

The priority 1103 is retrieved by consulting the VLANID-priority association table 700, the service IP address 803 of the file system access information table 800 and the VLANID-service IP address association table 900.

To give an example, in the file system access information table 800, an access request that node 1 has received at 3:51: 30 a.m. on Dec. 20, 2004 has, as the file system name 802, "FS-1A" and, as the service IP addresses 803, "SIP-V10".

A consultation with the file system-resource group association table 1000 reveals that "FS-1A" is associated with "RG 1-1".

"SIP-V10" is found to be associated with "10" as the VLANID 901 by consulting the VLANID-service IP address association table 900. The VLANID-priority association table 700 shows that "10" as the VLANID 901 is associated with "7" as the priority 702.

Thus, "20041220035130" as the date and time 1101 is found to be associated with "RG 1-1" as the resource group name 1102 and "7" as the priority 1103. This means that node 1 has received, at 3:51:30 a.m. on Dec. 20, 2004, the frame 600 containing a request to access one of the file systems 301 within RG 1-1 and that the priority 651 of the received frame 600 is "7".

Similarly, "20041220035132" as the date and time 1101 is found to be associated with "RG 1-1" as the resource group name 1102 and "5" as the priority 1103. "20041220035135" as the date and time 1101 is found to be associated with "RG 1-2" as the resource group name 1102 and "2" as the priority 1103. "20041220035540" as the date and time 1101 is found to be associated with "RG 1-2" as the resource group name 1102 and "3" as the priority 1103. "20041220045121" as the date and time 1101 is found to be associated with "RG 1-1" as the resource group name 1102 and "4" as the priority 1103.

In this way, the association between the priority 651 of the frame 600 and one of the resource groups 202 that is requested by the frame 600 for access is revealed for each received frame 600 (i.e., each received access request).

FIG. 12 is an explanatory diagram of a unit-time basis resource group access priority table according to this embodiment.

A unit-time basis resource group access priority table 1200 is created by the priority level determining processing module 521 inside the fail over control module 520 as shown in FIG. 25.

In FIG. 12, listed as a resource group name 1201 are the names of the resource groups 202 that are managed by node 1. Since node 1 in this embodiment manages RG 1-1, RG 1-2 and RG 1-3 as shown in FIG. 2, these are listed as the resource group name 1201.

A priority 1202 corresponds to the priority 651 of the received frame 600, and accordingly ranges from 0 through 7 as shown in FIG. 6.

In the unit-time basis resource group access priority table 1200, values entered in the cells of the resource group name 1201 and the priority 1202 are the number of the frames 600 received by node 1 per unit time (access request count, hereinafter simply referred to as access count) complied by the resource group name 1201 and by the priority 1202. The unit time is one hour in this embodiment, but may be set differently (for example, thirty minutes, two hours, or twenty-four hours).

Specifically, the priority level determining processing module 521 consults the access-to-access basis resource group access priority table 1100 to create the unit-time basis resource group access priority table 1200. Taking FIG. 11 as an example, node 1 has received, at 3:51:30 a.m. on Dec. 20, 2004 (which is obtained by looking up the table 1100 for the date and time 1101), the frame 600 containing a request to access one of the file systems 301 within RG 1-1 (the resource group name 1102), and the priority 651 of the received frame 600 is "7" (the priority 1103). As a result of the access, the access count is increased by "1" in a cell of the unit-time basis resource group access priority table 1200 where the resource group name 1201 is "RG 1-1" and the priority 1202 is "7".

FIG. 12 is an example of compiling the access count for an hour in this fashion.

Entered as a total 1203 is the total access count compiled by the resource group name 1201 for an hour.

In the example of FIG. 12, node 1 has received a request to access RG 1-1 260 times in total within an hour. The 260 access requests include 200 access requests whose priority 651 is "7", 10 access requests whose priority 651 is "5", and 50 access requests whose priority 651 is "4".

Within the same one hour, node 1 has received a request to access RG 1-2 490 times in total. The 490 access requests include 10 access requests whose priority 651 is "5", 200 access requests whose priority 651 is "4", 150 access requests whose priority 651 is "3", 100 access requests whose priority 651 is "2", and 30 access requests whose priority 651 is "1".

Within the same one hour, node 1 has received a request to access RG 1-3 540 times in total. The 540 access requests include 40 access requests whose priority 651 is "3", 200 access requests whose priority 651 is "1", and 300 access requests whose priority 651 is "0".

This embodiment determines an order of priority in fail over of the resource groups 202 based on the access count that is compiled in the manner shown in FIG. 12. Specifically, the priority level determining processing module 521 sums up, for each of the resource groups 202, values obtained by multiplying a compiled access count by a weighting factor (hereinafter referred to as weighted access count), and determines an order of priority based on the sums. The weighting factor is calculated from the priority 1202 and the total access count.

Figure 13:
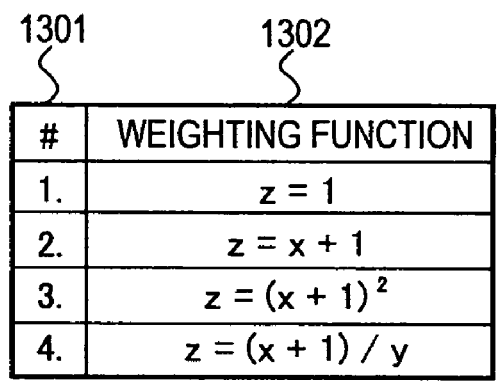
FIG. 13 is an explanatory diagram of a weighting function according to the embodiment of this invention.

FIG. 13 is an explanatory diagram of a weighting function according to this embodiment.

A weighting function is a formula for calculating a weighting factor.

FIG. 13 shows four different weighting functions. In the following description, the access counts shown in FIG. 12 are set as "reference values". In FIG. 13, "x" represents the priority 1202 that corresponds to each reference value, "y" represents the total 1203 of the reference values for each of the resource groups 202, and "z" represents a weighting factor by which a reference value is multiplied.

Stored in FIG. 13 as a function number (#) 1301 are the identifiers of the four different weighting functions. Hereinafter, a weighting function whose function number is "1" is referred to as "weighting function 1", and the same applies to the other three weighting functions.

Weighting function 1 is "z=1". The weighting factor z when weighting function 1 is applied is always "1" whichever value the priority 1202 takes. In this case, a point is determined based solely on the access count irrespective of the priority 1202. The point is an indicator used to determine a priority level in fail over. The point equals a priority level in fail over when the priority level of a resource group in fail over is determined by one weighting function alone. Details of the point will be given later with reference to FIGS. 14 to 17. How the point is determined when weighting function 1 is applied will be described later with reference to FIG. 14.

Weighting function 2 is "z=x+1". The weighting factor z when weighting function 2 is applied is a value obtained by adding "1" to the priority 1202. In this case, a priority level is determined based on the priority 1202 and the access count both. The weighting factor z is obtained by adding "1" to the priority 1202 because otherwise the access count of when the priority 1202 is "0" is not reflected on the resultant priority level. How the point is determined when weighting function 2 is applied will be described later with reference to FIG. 15.

With weighting function 3, the weighting factor z is obtained by squaring (x+1). In this case, a priority level is determined based on the priority 1202 and the access count both as in the case of weighting function 2. A difference between the two cases is that here the priority 1202 is given more importance than in the case of weighting function 2. How the point is determined when weighting function 3 is applied will be described later with reference to FIG. 16.

Weighting function 4 is "z=(x+1)/y". The weighting factor z when weighting function 4 is applied is the quotient of "the priority 1202 plus 1" divided by the total access count of each of the resource groups 202. In this case, a priority level is determined based solely on the priority 1202. How the point is determined when weighting function 4 is applied will be described later with reference to FIG. 17.

FIG. 14 is an explanatory diagram of a weighted access count of when weighting function 1 is applied in this embodiment.

Listed as a resource group name 1401 in FIG. 14 are the names of the resource groups 202 that are managed by node 1, and the resource group name 1401 corresponds to the resource group name 120i of FIG. 12.

A priority 1402 is the priority 651 of the received frame 600, and corresponds to the priority 1202 of FIG. 12.

Values entered in the cells related to the resource group name 1401 and the priority 1402 are weighted access counts of when weighting function 1 is applied.

Entered as a total 1403 is the total weighted access count counted for each resource group name that is listed as the resource group name 1401.

When weighting function 1 is applied, the weighting factor z is always "1". Therefore, any weighted access count equals its corresponding reference value as shown in FIG. 14. Specifically, the total 1403 is "260" for RG 1-1, "490" for RG 1-2, and "540" for RG 1-3.

A point 1404 is a value set based on the total 1403, and is used to determine a priority level in fail over. The point 1404 is "1" for RG 1-3, which has the largest total 1403 of the three resource groups, "2" for RG 1-2, which has the second-largest total 1403, and "3" for RG 1-1, which has the smallest total 1403.

FIG. 15 is an explanatory diagram of a weighted access count of when weighting function 2 is applied in this embodiment.

Listed as a resource group name 1501 in FIG. 15 are the names of the resource groups 202 that are managed by node 1, and the resource group name 1501 corresponds to the resource group name 1201 of FIG. 12.

A priority 1502 is the priority 651 of the received frame 600, and corresponds to the priority 1202 of FIG. 12.

Values entered in the cells related to the resource group name 1501 and the priority 1502 are weighted access counts of when weighting function 2 is applied.

Entered as a total 1503 is the total weighted access count counted for each resource group name that is listed as the resource group name 1501.

A point 1504 is a value set based on the total 1503, and is used to determine a priority level in fail over.

When weighting function 2 is applied, the weighting factor z is a value obtained by adding "1" to the priority 1502. Then the weighted access counts are as shown in FIG. 15. For instance, when the resource group name 1501 is "RG 1-1"

and the priority 1502 is "4", the weighting factor z is "5" as a result of adding "1" to "4". In this case, the weighted access count is "250". What is parenthesized to the right of the weighted access count in FIG. 15 shows that the weighted access count "250" is obtained by multiplying the reference value "50" by the weighting factor z "5". The weighted access counts in the other cells related to the priority 1502 and the resource group name 1501 are calculated in the same manner.

As a result, the total 1503 is "1910" for RG 1-1, "2020" for RG 1-2, and "860" for RG 1-3.

A resource group that has a larger total 1503 has a smaller point 1504. The point 1504 is "1" for RG 1-2, "2" for RG 1-1, and "3" for RG 1-3.

FIG. 16 is an explanatory diagram of a weighted access count of when weighting function 3 is applied in this embodiment.

Listed as a resource group name 1601 in FIG. 16 are the names of the resource groups 202 that are managed by node 1, and the resource group name 1601 corresponds to the resource group name 1201 of FIG. 12.

A priority 1602 is the priority 651 of the received frame 600, and corresponds to the priority 1202 of FIG. 12.

Values entered in the cells related to the resource group name 1601 and the priority 1602 are weighted access counts of when weighting function 3 is applied.

Entered as a total 1603 is the total weighted access count counted for each resource group name that is listed as the resource group name 1601.

A point 1604 is a value set based on the total 1603, and is used to determine a priority level in fail over.

When weighting function 3 is applied, the weighting factor z is a value obtained by adding "1" to the priority 1602 and then squaring the sum. Then the weighted access counts are as shown in FIG. 16. For instance, when the resource group name 1601 is "RG 1-1" and the priority 1602 is "4", the weighting factor z is "25" as a result of adding "1" to "4" and squaring the resultant "5". In this case, the weighted access count is "1250". What is parenthesized to the right of the weighted access count in FIG. 16 shows that the weighted access count "1250" is obtained by multiplying the reference value "50" by the weighting factor z "25". The weighted access counts in the other cells related to the priority 1602 and the resource group name 1601 are calculated in the same manner.

As a result, the total 1603 is "14410" for RG 1-1, "8780" for RG 1-2, and "1740" for RG 1-3.

A resource group that has a larger total 1603 has a smaller point 1604. The point 1604 is "1" for RG 1-1, "2" for RG 1-2, and "3" for RG 1-3.

FIG. 17 is an explanatory diagram of a weighted access count of when weighting function 4 is applied in this embodiment.

Listed as a resource group name 1701 in FIG. 17 are the names of the resource groups 202 that are managed by node 1, and the resource group name 1701 corresponds to the resource group name 1201 of FIG. 12.

A priority 1702 is the priority 651 of the received frame 600, and corresponds to the priority 1202 of FIG. 12.

Values entered in the cells related to the resource group name 1701 and the priority 1702 are weighted access counts of when weighting function 4 is applied.

Entered as a total 1703 is the total weighted access count counted for each resource group name that is listed as the resource group name 1701.

A point 1704 is a value set based on the total 1703, and is used to determine a priority level in fail over.

When weighting function 4 is applied, the weighting factor z is a value obtained by adding "1" to the priority 1702 and dividing the sum by the total reference value y which is calculated for each resource group name listed as the resource group name 1701 (in other words, by dividing the sum by the total 1203). Then the weighted access counts are as shown in FIG. 17. For instance, when the resource group name 1701 is "RG 1-1" and the priority 1702 is "4", the weighting factor z is obtained by adding "1" to "4" and dividing the resultant "5" by the total reference value (the total 1203) "260" of RG 1-1. In this case, the weighted access count is "0.96". What is parenthesized to the right of the weighted access count in FIG. 17 shows that the weighted access count "0.96" is obtained by multiplying the reference value "50" by the weighting factor z, namely the quotient of "5" divided by "260". The weighted access counts in the other cells related to the priority 1702 and the resource group name 1701 are calculated in the same manner.

As a result, the total 1703 is "7.34" for RG 1-1, "4.11" for RG 1-2, and "1.60" for RG 1-3.

A resource group that has a larger total 1703 has a smaller point 1704. The point 1704 is "1" for RG 1-1, "2" for RG 1-2, and "3" for RG 1-3.

The weighted access counts, the total 1403 and others, the point 1404 and others in FIGS. 14 to 17 are calculated by the priority level determining processing module 521.

FIG. 18 is an explanatory diagram of a comprehensive assessment of a priority level according to this embodiment.

A comprehensive assessment of a priority level according to this embodiment is made, as shown in FIG. 18, by the priority level determining processing module 521 based on the sum of points obtained by applying weighting function 1 through weighting function 3. FIG. 25 shows a procedure of making the assessment.

Listed as a resource group name 1801 in FIG. 18 are the names of the resource groups 202 that are managed by node 1, and the resource group name 1801 corresponds to the resource group name 1201 of FIG. 12.

A point 1802 is the point obtained by applying each weighting function for a resource group name listed as the resource group name 1801. The point 1802 corresponds to the point 1404 of FIG. 14, the point 1504 of FIG. 15, and the point 1604 of FIG. 16.

Entered as a total 1803 is the sum of points in the cells of the point 1802 summed up for each resource group name that is listed as the resource group name 1801.

A priority level 1804 is a priority level in fail over determined from the total 1803.

As shown in FIG. 14, the point 1404 of RG 1-1 when weighting function 1 is applied is "3". Therefore, in FIG. 18, "3" is entered as the point 1802 in a cell of the table where the resource group name 1801 is RG 1-1 and the weighting function applied is weighting function 1. Similarly, when weighting function 1 is applied, the point 1802 is "2" for RG 1-2 and "1" for RG 1-3.

Similarly, when weighting function 2 is applied, the point 1802 is "2" for RG 1-1, "1" for RG 1-2 and "3" for RG 1-3 as indicated by the point 1504 of FIG. 15.

Similarly, when weighting function 3 is applied, the point 1802 is "1" for RG 1-1, "2" for RG 1-2 and "3" for RG 1-3 as indicated by the point 1604 of FIG. 16.

The total 1803 is accordingly "6" for RG 1-1, "5" for RG 1-2 and "7" for RG 1-3.

The priority level 1804 of RG 1-2, whose total 1803 is smallest at "5", is set to "1". The priority level 1804 of RG 1-1 is "2", and the priority level 1804 of RG 1-3 is "3". A smaller value of the priority level 1804 means a higher priority level, and fail over is executed first for RG 1-2, then RG 1-1, and lastly RG 1-3.

The priority level determining processing module 521 stores the determined priority level 1804 in the shared LU 124. As has been described, the priority level 1804 in this embodiment is determined by the priority level determining processing module 521 of node 1. When a failure occurs in node 1, node 2 searches the shared LU 124 for the priority level 1804, and the fail over processing module 522 of node 2 executes fail over first for RG 1-2, then RG 1-1, and lastly RG 1-3 according to the priority level 1804.

In this case, the priority level 1804 is determined by taking into account both the access count and priority. The virtual LANs 201 that use RG 1-2, which has the highest priority level 1804, are VLAN 50 and VLAN 60 in the example of FIG. 3. In other words, VLAN 50 and VLAN 60 (strictly speaking, the clients 140 that belong to VLAN 50 and VLAN 60) demand from node 1 a higher level of service than any other virtual LANs 201 in terms of quantity and quality both.

Accordingly, when a failure occurs in node 1, fail over is executed first for RG 1-2 to thereby resume a service to VLAN 50 and VLAN 60 quicker than others. This makes the time period during which the service to VLAN 50 and VLAN 60 is stopped shorter than that of other virtual LANs 201, and helps to provide a relatively high level of service to VLAN 50 and VLAN 60.

If the total 1803 of one of the resource groups 202 is the same as the total 1803 of another of the resource groups 202, the value of the priority level 1804 is set smaller (the priority level is set higher) for one that has, as the point 1802, a smaller point obtained when weighting function 3 is applied. If these two resource groups also have the same point for weighting function 3 as the point 1802, the value of the priority level 1804 is set smaller for one that has, as the point 1802, a smaller point obtained when weighting function 2 is applied. If these two resource groups also have the same point for weighting function 2 as the point 1802, the value of the priority level 1804 is set smaller for one that has, as the point 1802, a smaller point obtained when weighting function 1 is applied.

In this embodiment, the priority level 1804 is determined based on the total 1803 of the point 1404, the point 1504 and the point 1604 which are obtained when weighting functions 1, 2 and 3 are applied. Alternatively, the priority level 1804 may be determined based on the total that includes the point 1704, which is obtained when weighting function 4 is applied, in addition to the point 1404, the point 1504 and the point 1604. In this case, the point 1704 obtained when weighting function 4 is applied is added as the point 1802 of FIG. 18.

It is also possible to determine the priority level 1804 based on only one of the four weighting functions.

For instance, the priority level 1804 may be determined based solely on weighting function 1. In this case, the point 1404 obtained when weighting function 1 is applied equals the priority level 1804, and fail over is executed first for RG 1-3, then RG 1-2, and lastly RG 1-1.

The point 1404 is determined based on the access count alone. Therefore, the virtual LANs 201 that use RG 1-3 demand on node 1 a higher level of service than any other virtual LANs 201 in terms of quantity.

By executing fail over first for RG 1-3 when a failure occurs in node 1, a service provided by RG 1-3 can be resumed quicker than others. This makes the time period during which the service to the virtual LANs 201 that use RG 1-3 is stopped shorter than that of other virtual LANs 201, and a relatively high level of service is provided to those virtual LANs 201.

It is also possible to determine the priority level 1804 based solely on weighting function 4, for example. In this case, the point 1704 obtained when weighting function 4 is applied equals the priority level 1804, and fail over is executed first for RG 1-1, then RG 1-2, and lastly RG 1-3.

The point 1704 is determined based on the priority. Therefore, the virtual LANs 201 that use RG 1-1 demand on node 1 a higher level of service than any other virtual LANs 201 in terms of quality.

By executing fail over first for RG 1-1 when a failure occurs in node 1, a service provided by RG 1-1 can be resumed quicker than others. This makes the time period during which the service to the virtual LANs 201 that use RG 1-1 is stopped shorter than that of other virtual LANs 201, and a relatively high level of service is provided to those virtual LANs 201.

Next processing executed by the modules of the nodes 110 shown in FIG. 5. will be described. The following description takes as an example processing executed by the modules of node 1 (except for FIG. 26). The modules of node 2 execute similar processing.

FIG. 19 is a flow chart of VLAN packet reception processing according to this embodiment.

The VLAN packet reception processing is executed by the VLAN packet transmission/reception processing module 501 when node 1 receives a packet (the frame 600 containing an IP packet, to be exact. The same holds true throughout the following description) from one of the virtual LANs 201.

As the VLAN packet reception processing is started, the VLAN packet transmission/reception processing module 501 first judges whether or not there is a request to terminate the processing (1901).

When it is judged in the step 1901 that there is a termination request, the VLAN packet transmission/reception processing module 501 terminates the processing.

On the other hand, when it is judged in the step 1901 that there is no termination request, the VLAN packet transmission/reception processing module 501 proceeds to receive a packet (1902).

The VLAN packet transmission/reception processing module 501 then makes the priority recognizing processing module 502 execute priority recognizing processing (1903). Details of the priority recognizing processing will be given later with reference to FIG. 21.

Next, the VLAN packet transmission/reception processing module 501 makes the access request reception processing module 511 execute access request reception processing (1904). Details of the access request reception processing will be given later with reference to FIG. 22.

Then the VLAN packet transmission/reception processing module 501 repeats the step 1901 and makes a judgment.

FIG. 20 is a flow chart of VLAN packet transmission processing according to this embodiment.

The VLAN packet transmission processing is executed by the VLAN packet transmission/reception processing module 501 when node 1 sends a packet in response to a packet received from one of the virtual LANs 201.

As the VLAN packet transmission processing is started, the VLAN packet transmission/reception processing module 501 first judges whether or not there is a request to terminate the processing (2001).

When it is judged in the step 2001 that there is a termination request, the VLAN packet transmission/reception processing module 501 terminates the processing.

On the other hand, when it is judged in the step 2001 that there is no termination request, the VLAN packet transmission/reception processing module 501 attaches a VLAN tag to the frame 600 in which a packet is contained (2002). Specifically, the VLAN packet transmission/reception processing module 501 sets the value of the TCI 650 of the frame 600 to transmit. When the frame 600 to be sent is a response to the received frame 600, the VID 653 in the TCI 650 of the frame 600 to be sent is set to the same value as the VID 653 of the received frame 600.

Next, the VLAN packet transmission/reception processing module 501 sends the frame 600 to which the VLAN tag is attached (2003).

The VLAN packet transmission/reception processing module 501 then repeats the step 2001 and makes a judgment.

FIG. 21 is a flow chart of priority recognizing processing according to this embodiment.

The priority recognizing processing is executed by the priority recognizing processing module 502 when the priority recognizing processing module 502 is called up in the step 1903 of FIG. 19 by the VLAN packet transmission/reception processing module 501.

As the priority recognizing processing is started, the priority recognizing processing module 502 first removes the VLAN tag from the received frame 600 (2101). Specifically, the TCI 650 is removed from the received frame 600.

The priority recognizing processing module 502 next searches for VLANID (2102). Specifically, the priority recognizing processing module 502 looks up the VLANID-priority association table 700 for the VLANID 701 as shown in FIG. 7.

Then the priority recognizing processing module 502 judges whether or not the same ID as the VID 653 of the removed VLAN tag is in a cell of the VLANID 701 on the VLANID-priority association table 700 (2103).

When it is judged in the step 2103 that the same ID as the VID 653 is in a cell of the VLANID 701 on the table 700, it means that node 1 has received a packet from this virtual LAN 201 before. In this case, the priority recognizing processing module 502 updates the priority 702 that is associated with this VLANID 701 to the value of the priority 651 of the removed VLAN tag (2104). Then the priority recognizing processing module 502 ends the processing.

On the other hand, when it is judged in the step 2103 that the same ID as the VID 653 is not in any cell of the VLANID 701 on the table 700, it means that node 1 has never received a packet from this virtual LAN 201 before. In this case, the priority recognizing processing module 502 adds this VID 653 as the VLANID 701 to the table 700. The priority recognizing processing module 502 also sets the priority 702 that is associated with the added VID 653 to the value of the priority 651 of the removed VLAN tag (2105). Then the priority recognizing processing module 502 ends the processing.

FIG. 22 is a flow chart of access request reception processing according to this embodiment.

The access request reception processing is executed by the access request reception processing module 511 when the access request reception processing is called up in the step 1904 of FIG. 19 by the VLAN packet transmission/reception processing module 501.

As the access request reception processing is started, the access request reception processing module 511 first records access information (2201). Specifically, as shown in FIG. 8, the access request reception processing module 511 adds, to the file system access information table 800, as the date and time 801, the file system name 802 and the service IP address 803, the date and time of reception of an access request contained in the received packet, the name of the file system requested for access, and a service IP address used to access the requested file system.

Next, the access request reception processing module 511 executes file read processing or file write processing according to the access request (2202).

The access request reception processing module 511 then sends a response to the access request (2203). Specifically, the access request reception processing module 511 makes the VLAN packet transmission/reception processing module 501 execute the VLAN packet transmission processing shown in FIG. 20.

Then the access request reception processing module 511 ends the processing.

FIG. 23 is a flow chart of priority level determining processing according to this embodiment.

The priority level determining processing is started by the priority level determining processing module 521 at the same time node 1 starts running, and is kept executed while node 1 is running normally.

As the priority level determining processing is started, the priority level determining processing module 521 first executes initializing processing (2301). Details of the initializing processing will be given later with reference to FIG. 24.

The priority level determining processing module 521 then executes priority level updating processing (2302). Details of the priority level updating processing will be given later with reference to FIG. 25.

Next, the priority level determining processing module 521 goes into one-hour sleep (2303), and emerges from the sleep to return to the step 2302. Specifically, after an hour following the execution of the priority level updating processing (2302), the priority level updating processing (2302) is executed again. Subsequently, the priority level updating processing (the step 2302) is executed every hour in a similar manner. The sleep in this embodiment is one-hour long, but may be set differently (for example, thirty minutes, two hours, or twenty-four hours).

FIG. 24 is a flow chart of initializing processing according to this embodiment.

The initializing processing is executed by the priority level determining processing module 521 in the step 2301 of the priority level determining processing shown in FIG. 23.

As the initializing processing is started, the priority level determining processing module 521 first creates the VLANID-service IP address association table 900 (2401). The VLANID-service IP address association table 900 has already been described with reference to FIG. 9 and, accordingly, the description is omitted here.

The priority level determining processing module 521 next creates the file system-resource group association table 1000 (2402). The file system-resource group association table 1000 has already been described with reference to FIG. 10 and, accordingly, the description is omitted here.

Then the priority level determining processing module 521 ends the initializing processing.

FIG. 25 is a flow chart of priority level updating processing according to this embodiment.

The priority level updating processing is executed by the priority level determining processing module 521 in the step 2302 of the priority level determining processing shown in FIG. 23.

As the priority level updating processing is started, the priority level determining processing module 521 first creates the unit-time basis resource group access priority table 1200 (2501). The unit-time basis resource group access priority table 1200 has already been described with reference to FIG. 12 and, accordingly, the description is omitted here.

Next, the priority level determining processing module 521 makes a comprehensive assessment to determine a new priority level (2502). The comprehensive assessment is made as has been described with reference to FIG. 18. The priority level newly determined in the step 2502 is the priority level 1804 of FIG. 18. Weighted access counts, weighting functions, and other data necessary to make the comprehensive assessment are as have been described with reference to FIGS. 13 to 17. Accordingly, the description will not be repeated here.

The priority level determining processing module 521 stores, in the shared LU 124, the priority level newly determined in the step 2502 (2503).

Then the priority level determining processing module 521 ends the priority level updating processing.

FIG. 26 is a flow chart of fail over processing according to this embodiment.

The fail over processing is executed by the fail over processing module 522 of node 2 when there is a failure in node 1, and by the fail over processing module 522 of node 1 when there is a failure in node 2. Described here as an example is fail over processing executed by the fail over processing module 522 of node 2 when a failure has occurred in node 1. The fail over processing module 522 of node 1 executes similar processing as the one described below.

As the fail over processing is started, the fail over processing module 522 first reads the priority level 1804 shown in FIG. 18 out of the shared LU 124 (2601).

Then the fail over processing module 522 recognizes the read priority level 1804 (2602).

The fail over processing module 522 performs fail over on the resource groups 202 according to the read priority level 1804, and services of the resource groups 202 that have finished fail over are resumed (2603).

Next, the fail over processing module 522 judges whether or not services of all the resource groups 202 have been resumed (2604).

When it is judged in the step 2604 that not all of the resource groups 202 have resumed providing services, the processing returns to the step 2603.

On the other hand, when it is judged in the step 2604 that all the resource groups 202 have resumed providing services, the fail over processing module 522 ends the processing.

In this embodiment, the priority level 1804 determined is stored in the shared LU 124. Alternatively, the nodes 110 may exchange the priority level 1804 with each other through communications. In this case, the nodes 110 may communicate the priority level 1804 with each other by burying it in heartbeat signals. One of the nodes 110 receives the priority level 1804 contained in heartbeat signals from the other of the nodes 110, and stores the received priority level 1804 in the main memory 113 or the like. This eliminates the need for the shared LU 124.

In this embodiment, the nodes 110 respectively determine the order of priority 1804 in fail over based on the priority 651 of the received frame 600. However, any component of the cluster system 100 can determine the priority level 1804. For instance, node 1 stores, in the shared LU 124, the priority 651 and other information of the received frame 600. When a failure occurs in node 1, node 2 consults the information stored in the shared LU 124 to determine the priority level 1804 and execute fail over according to the priority level 1804. It is also possible for a resource outside of the cluster system 100 (e.g., a management server (illustration thereof is omitted) connected to the LANs 150) to determine the priority level 1804 in a similar manner.

In this embodiment, a frame containing VLAN tag information and following IEEE 802.1D IEEE 802.1p), IEEE 802.1Q or the like is sent and received over a LAN.

Each node constituting the cluster system extracts a priority and a VID which are contained in VLAN tag information of a received frame. Based on the extracted priority and VID, an order of priority in fail over is determined in preparation for when a failure occurs in the node. For example, a high priority level is set to a resource group used by a VLAN that sends a high priority frame.

When a failure occurs in one of the nodes, another node consults the order of priority to execute fail over. As a result, a service to a VLAN that demands a high level of service can be resumed quicker than others.

A priority contained in a frame of a data link layer is consulted in this embodiment. Therefore, an order of priority in fail over can be determined without depending on an upper layer protocol.

The embodiment described above is an example of applying this invention to a TCP/IP network with an IP packet stored in an Ethernet frame. This invention is also applicable to other forms of network.

For instance, this invention can be applied to zoning of fibre channel switches in a storage area network (SAN). In the case where priority information indicative of a demanded level of service is contained in a data link layer frame sent and received over an SAN, an order of priority in fail over can be determined by consulting the priority information in the same way that is described in the above embodiment.

What is claimed is:

1. A network storage system coupled to a client computer via a network, comprising:
    a first node and a second node which provide the client computer with one or more file systems using one or more service IP addresses;
    an inter-node communication path which couples the first node and the second node to each other; and
    at least one disk subsystem coupled to the first node and the second node,
    wherein the disk subsystem has plural logical units,
    wherein at least one of the plural logical units is a shared logical unit which is used by the first node and the second node,
    wherein the first node includes:
        a priority recognizing processing module which consults a priority of a frame received from the client computer;
        a priority level determining processing module which determines, based on the priority of the frame, an order of fail over priority for plural software resources including the service IP address and the file system; and
        a first monitoring processing module which sends given monitoring signals at a given timing,
    wherein the priority level determining processing module:
        calculates a first value obtained by multiplying the priority by the number of frames that are received by the first node;
        calculates a second value which is the product of the square of the priority and the number of frames that are received by the first node;
        determines the order of fail over priority from the sum of the first value and the second value; and
        stores the determined order of fail over priority in the shared logical unit, and wherein the second node includes:
a second monitoring processing module which receives the monitoring signals sent from the first monitoring processing module and, when the monitoring signals fail to arrive at the given timing, judges that a failure has occurred in the first node; and
a fail over processing module which, when the second monitoring processing module judges that a failure has occurred in the first node, consults the order of fail over priority stored in the shared logical unit and performs fail over on the plural software resources according to the order of fail over priority consulted.

2. A cluster system coupled to a client computer via a network, comprising plural nodes which provide services to the client computer,
wherein a first node of the plural nodes has a priority recognizing processing module which consults a priority of a frame received from the client computer, and a priority level determining processing module which determines the order of fail over priority based on a calculation of the priority consulted by the priority recognizing processing module and the number of frames that are received by the first node, the calculation being multiplication of the priority or the square thereof and the number of frames that are received by the first node, and
wherein a second node of the plural nodes has a fail over processing module, which performs fail over on plural software resources managed by the first node according to an order of fail over priority that is based on the priority consulted by the priority recognizing processing module of the first node.

3. A fail over method for a cluster system which is coupled to a client computer via a network and which has plural nodes to provide services to the client computer, the method comprising:
consulting a priority of a frame which is received by a first node of the plural nodes from the client computer;
determining an order of fail over priority used to mount plural software resources managed by the first node to a second node of the plural nodes for fail over based on a calculation of the priority consulted and the number of frames that are received by the first node, the calculation being multiplication of the priority or the square thereof and the number of frames that are received by the first node; and
mounting the plural software resources to the second node of the plural nodes for fail over according to the order of fail over priority.

* * * * *